(12) United States Patent
Kakutani

(10) Patent No.: US 7,046,844 B2
(45) Date of Patent: May 16, 2006

(54) IMAGE PROCESSING DEVICE, IMAGE PROCESSING METHOD, RECORDED MEDIUM, AND PROGRAM

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 544 days.

(21) Appl. No.: 10/204,786

(22) PCT Filed: Oct. 4, 2001

(86) PCT No.: PCT/JP01/08774

§ 371 (c)(1),
(2), (4) Date: Aug. 23, 2002

(87) PCT Pub. No.: WO02/32113

PCT Pub. Date: Apr. 18, 2002

(65) Prior Publication Data

US 2003/0021470 A1  Jan. 30, 2003

(30) Foreign Application Priority Data

Oct. 6, 2000 (JP) .............................. 2000-307859

(51) Int. Cl.
*G06K 9/00* (2006.01)
*G06F 13/00* (2006.01)
(52) U.S. Cl. ...................................... 382/167; 345/600
(58) Field of Classification Search ................ 382/162, 382/167, 254, 276; 358/1.8, 1.9, 3.16, 3.23, 358/518, 523, 530; 345/88, 589, 591, 600; 347/41
See application file for complete search history.

(56) References Cited

U.S. PATENT DOCUMENTS

| | | | |
|---|---|---|---|
| 4,999,646 A * | 3/1991 | Trask | 347/41 |
| 5,031,050 A * | 7/1991 | Chan | 358/3.16 |
| 5,600,764 A | 2/1997 | Kakutani | 345/591 |
| 5,764,795 A * | 6/1998 | Takeo et al. | 382/167 |
| 5,801,854 A * | 9/1998 | Naylor, Jr. | 358/518 |
| 6,058,208 A * | 5/2000 | Ikeda et al. | 382/167 |
| 6,360,008 B1 * | 3/2002 | Suzuki et al. | 382/167 |
| 6,798,536 B1 * | 9/2004 | Muramoto | 358/1.9 |
| 6,809,714 B1 * | 10/2004 | Yamauchi et al. | 345/88 |
| 6,809,740 B1 * | 10/2004 | Weed | 345/589 |
| 6,906,825 B1 * | 6/2005 | Nakahara et al. | 358/1.9 |

FOREIGN PATENT DOCUMENTS

JP   7-30772   1/1995

* cited by examiner

*Primary Examiner*—Andrew W. Johns
*Assistant Examiner*—Amir Alavi
(74) *Attorney, Agent, or Firm*—Martine Penilla & Gencarella LLP

(57) ABSTRACT

When color converting image data of a first color coordinate system to image data of a second color coordinate system using a color conversion module, the tone values of said second image data are proportionally increased for conversion in a tone value range in which small dots or light dots are formed. Next, second image data is converted to dot volume data relating to the dot forming density for various dots with different tone values expressed per single dot. At this time, the proportional increase part of the tone values of the second image data is corrected, and suitable dot volume data is obtained. If this is done, even in an area where small dots or light dots are formed, it is possible to supplement insufficient resolution of image data during color conversion, and to display images of high image quality.

13 Claims, 19 Drawing Sheets

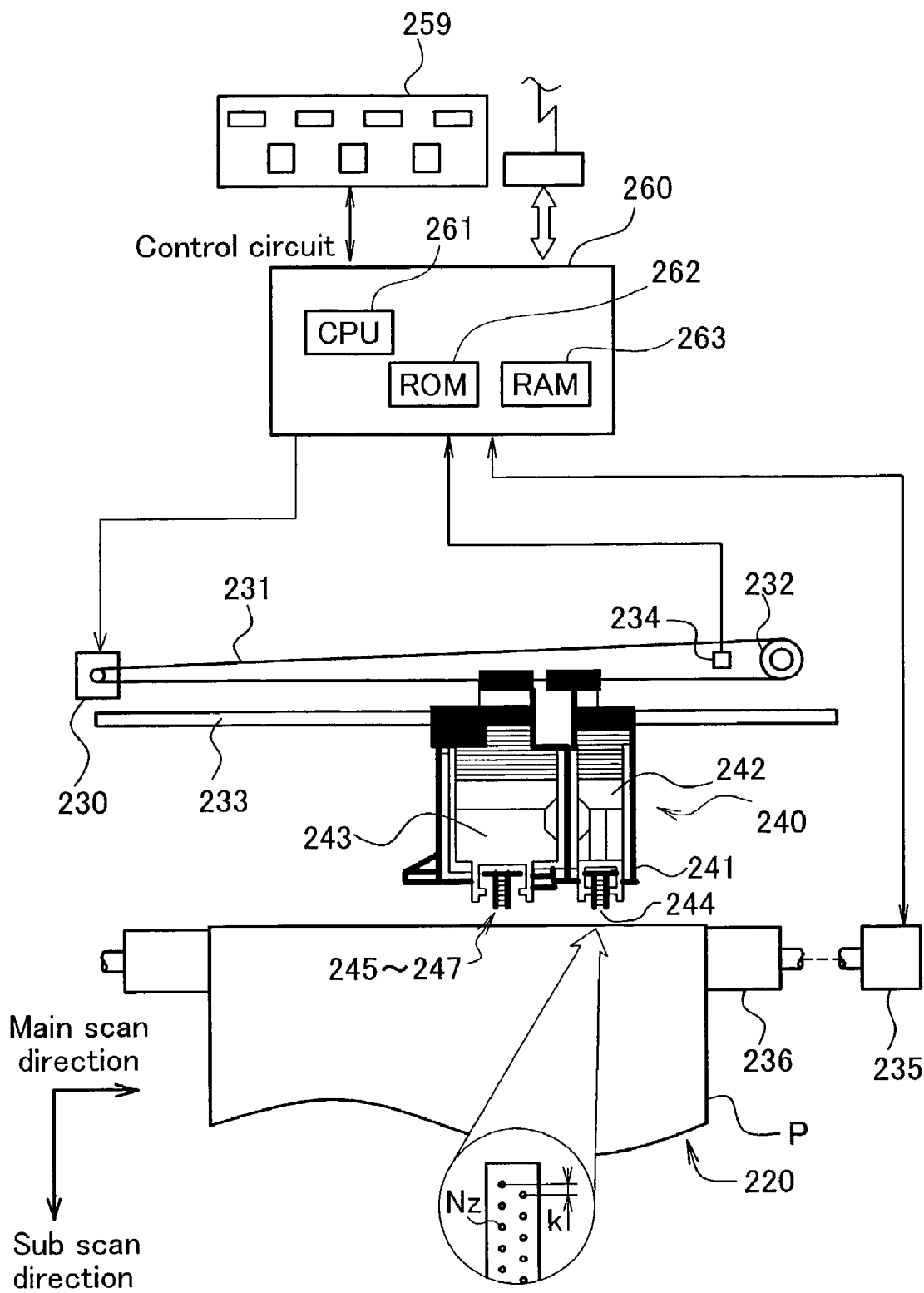

*Fig.11*

| (R,G,B) | ⇨ r_C_data | ⇨ Ke | ⇨ E_C_data | (Reference) C_data |
|---|---|---|---|---|
| (255,255,255) | 0 | 4 | 0 | 0 |
| (254,255,255) | 0.4 | 3.99 | 1 | 0 |
| (253,255,255) | 0.8 | 3.98 | 3 | 0 |
| (252,255,255) | 1.2 | 3.96 | 4 | 1 |
| (251,255,255) | 1.6 | 3.95 | 6 | 1 |
| (250,255,255) | 2.0 | 3.94 | 7 | 2 |
| (249,255,255) | 2.4 | 3.93 | 9 | 2 |
| (248,255,255) | 2.8 | 3.91 | 10 | 2 |
| (247,255,255) | 3.2 | 3.90 | 12 | 3 |
| (246,255,255) | 3.6 | 3.89 | 14 | 3 |
| (245,255,255) | 4.0 | 3.88 | 15 | 4 |
| ⋮ | ⋮ | ⋮ | ⋮ | ⋮ |

IMAGE PROCESSING DEVICE, IMAGE PROCESSING METHOD, RECORDED MEDIUM, AND PROGRAM

TECHNICAL FIELD

The present invention relates to technology for converting color image data, and more specifically relates to technology for converting image data of a first color coordinate system into dot volume data related to the dot formation density for the dots of each color of a second color coordinate system.

BACKGROUND ART

Image display devices that express color images by forming dots of each color on a printing medium or on a display medium called a liquid crystal display are widely used as output devices for various types of image equipment. With the concerned image display devices, only a specific limited number of multiple color dots can be formed, but by forming these colored dots mixed at a suitable ratio, it is possible to express color images.

Color image data that is input to an image display device is supplied as data combined with image data of specified colors, and normally, the various colored dots used to express color images by an image display device are used combined with different colors from the specified colors of image data that form the color image data. Because of this, to display color images using an image display device, the following type of data conversion is performed on the color image data, and the various colored dots are formed based on the obtained image data.

First, the color image data expressed as a set of the various colored image data is converted into image data according to specific colors for which it is possible to form dots using an image display device. The process of converting the color image data expressed as a set of specific colors into color image data expressed as a different set of colors in this way is called color conversion from a first color coordinate system into a second color coordinate system, or simply called 'color conversion'. After a color conversion is done once by an image display device, and color image data are converted by each color into a set of specific colors that can be printed as dots by an image display device, the obtained various colored image data is converted for each color to image data in an expression format based on the dot on-off state. A color image is expressed by the image display device forming various colored dots on the display medium based on the image data in an expression format based on the dot on-off state obtained in this manner.

Color images formed in this manner are expressed by various color dots, so when the dots show clearly, the image has a rough feel, with poor so-called granularity, making for poor image quality. To avoid this kind of degraded granularity, image display devices that can form dots that do not show clearly are widely used. Examples of dots that do not show clearly are small dots or light color dots. If an image is expressed by forming these dots which do not show clearly, it is possible to express images with good granularity and with high image quality.

Also, if these dots that do not show clearly are formed instead of normal dots, the increase portion of the tone value due to forming a certain number of dots, in other words, the tone value that can be expressed per dot, becomes smaller than the normal dots are formed. Therefore, with image display devices that can form small size dots (small dots) or light color dots (light dots), for example, it is possible to express fine level tone changes, and from this perspective as well, it is possible to express high image quality images.

However, although it is possible in theory to express fine level tone change by forming the small dots or the light dots, there are some cases in which fine level tone changes are not expressed enough. Of course, by forming dots that do not show clearly, an image with high image quality for which the dots do not show clearly is expressed, but it is not possible to obtain a sufficient effect of expressing fine level tone changes in addition to expressing images with good granularity. It would be possible to display images of even higher image quality if it were possible to sufficiently draw out the potential performance that image display devices have, making it possible to accurately express fine level tone changes as well.

The present invention was created to solve the problems of the prior art described above, and its goal is to, for an image display device that can form dots that do not show clearly such as small dots or light dots, to provide technology that makes it possible to display images with high image quality by drawing out the natural performance of the image display device.

DISCLOSURE OF THE INVENTION

To solve at least part of the problems described above, the following structure was used for the image processing apparatus of the present invention. Specifically, the summary of the invention is an image processing apparatus that converts image data expressed by sets of various tone values which express a color image into dot volume data related to dot formation density of various type dots which express different tone values per respective single dots, said image processing apparatus comprising:

a color conversion module that receives first image data expressed by sets of various tone values of a first color coordinate system and converts the first image data into second image data expressed by sets of the tone values of each color which comprises a second color coordinate system; and a dot volume data conversion module that converts said second image data into dot volume data of said various type dots with respect to each color of said second color coordinate system, wherein said color conversion module converts said first image data into second image data which are increased proportionally with the tone value relationship between said second image data kept in the same sequence, when said second image data is at least in a preset tone range where the smallest dots, which express the smallest tone value per respective single dots among the various type dots, are generated, and said dot volume data conversion module converts said second image data of which said tone value is increased proportionally into said dot volume data which have been corrected to be embarrassed from said proportional increase.

Also, the image processing method of the present invention corresponding to the aforementioned image processing apparatus is as follows:

an image processing method that converts image data expressed by sets of various tone values which express a color image into dot volume data related to dot formation density of various type dots which express different tone values per respective single dots, said image processing method comprising:

(A) a process of receiving first image data expressed by sets of various tone values of a first color coordinate system and converting the first image data into second image data expressed by sets of the tone values of each color which comprises a second color coordinate system; and (B) a process of converting said second image data into said dot volume data of said various type dots with respect to each color of said second color coordinate system, wherein said process (A) converts said first image data into second image data which are increased proportionally with the tone value relationship between said second image data kept in the same sequence, when said second image data is at least in a preset tone range where the smallest dots, which express the smallest tone value per respective single dots among the various type dots, are generated, and said process (B) converts said second image data of which said tone value is increased proportionally into said dot volume data which have been corrected to be embarrassed from said proportional increase.

The aforementioned invention of this application was completed by finding a reason why, for a prior image display device that can form dots that do not show clearly such as small dots or light dots, it is not possible to obtain sufficient improvement effect for image quality, and by taking into consideration knowledge that reflects that reason. In light of this, before explaining the reason that it is possible to display images of high image quality by drawing out the natural performance of the image display device by applying the invention of this application to an image display device that can form dots that do not show clearly such as small dots or light dots, first, we will explain hereafter the new knowledge we discovered.

To make the explanation simpler, we will explain an example of a case of color conversion of RGB image data into image data of the CMY colors. Specifically, we will explain a case where the image data of the first color coordinate system is RGB image data, and the image data of the second color coordinate system is CMY image data. Of course, the invention is not limited to this case, and the image data expressed by a set of tone values can be image data of various formats including, for example, image data according to a so-called Lab color coordinate system, or image data according to an XYZ color coordinate system. RGB image data is expressed by sets of tone values of the colors R, G, and B. Hereafter, image data for which the tone values of the colors R, G, and B are assigned respectively the values DR, DG, and DB will be displayed as (DR, DG, DB). Here, we will consider a case when image data for which RGB image data (255, 255, 255) changes to (245, 255, 255) undergoes color conversion to CMY color image data. If the RGB image data is 1 byte (8 bits) data, then (255, 255, 255) would express a white image, and (245, 255, 255) would express a slightly light cyan color image.

FIG. 22(a) is an explanatory diagram that conceptually shows the situation when RGB image data that changes from this kind of white image to a light cyan color undergoes color conversion to CMY color image data. The horizontal axis of FIG. 22(a) conceptually shows RGB image data, and the left edge of the horizontal axis shows image data (255, 255, 255) while the right edge shows image data (245, 255, 255). We will explain the details later, but normally, color conversion is performed by referencing a number chart called a color conversion table. In a color conversion table, combinations of tone values for each color CMY are set to correspond to combinations of tone values for each color RGB selected discretely. Here, combinations of tone values for each color CMY are set corresponding to RGB image data (255, 255, 255) and RGB image data (245, 255, 255).

As described previously, RGB image data (255, 255, 255) shows a white color, so all the tone values are set to 0 for the tone values of each color CMY in the color conversion table. Also, RGB image data (245, 255, 255) shows a slightly light cyan color, so that as the tone values for each color CMY corresponding to the color conversion table, the tone values of M and Y are set to 0, and only the tone value for C is set to a value that is not 0 (e.g. tone value 4). From this fact that the tone value for only C is set to a certain value that is not 0, when taking RGB image data for which white color changes to cyan color and this is color converted to data for each color CMY, it is sufficient to focus only on the tone value of the C color. In light of this, in FIG. 22(a), the tone value of the C color obtained by color converting the RGB image data is displayed using the vertical axis. As shown in the figure, the RGB data (255, 255, 255) on the left edge of the horizontal axis is converted to C color tone value 0, and the RGB image data (245, 255, 255) at the right side of the horizontal axis is converted to C color tone value 4. When color converting the RGB image data that is between these two points, it its acceptable to interpolate between the two points as shown by the dotted line in FIG. 22(a). Here, if as with the RGB image data, the image data of each CMY color is also 1 byte data, then only an integer of 0 or greater can be used for the C color tone value. Because of this, though interpolation is supposed to be as shown by the dotted line in FIG. 22(a), interpolation is done to data that changes in step fashion as with 0, 1, 2 . . . as shown by the solid line.

FIG. 22(b) is an explanatory diagram that conceptually shows the situation that obtains data (dot volume data) that is equivalent to the density of the dots to be formed on the display medium by doing color conversion and then converting the obtained image data again. By forming various types of dots based on the dot volume data obtained in this way, an image display device displays an image on a display medium. The horizontal axis of FIG. 22(b) shows RGB image data in the same manner as FIG. 22(a). Also, we are considering only the case of the C color tone value changing from tone value 0 to tone value 4 here, so only C color small dots (or light dots) are formed. In light of this, the dot volume data of the C color small dots is shown in the vertical axis of FIG. 22(b). As described previously, small dots are dots which do not show clearly, so to express an increase in unit volume tone value, more dots must be formed than with normal dots. Here, increasing the C color tone value by 1 corresponds to increasing the dot volume data of the C color small dots by 4.

As shown in FIG. 22(b), when RGB image data is changed from (255, 255, 255) to (245, 255, 255), the dot volume data of the C color small dots changes as with 0, 4, 8, . . . Of course, dot volume data can be in the form of the values 0, 1, 2, . . . , but as shown in FIG. 22(a), because the C color tone value changes as 0, 1, 2, . . . , the dot volume data of the C color small dots obtained by converting this end up changing in step form as with 0, 4, 8, . . . .

From the above knowledge, if the resolution of the image data of each CMY color is increased and the tone values of each color CMY can also use decimals, it may be possible to change the dot volume data of the small dots smoothly as with 0, 1, 2 . . . However, if 2 byte data is used for the image data of each CMY color expressed as 1 byte data in order to increase resolution, we can anticipate that there will be a significant increase in the image data volume. Furthermore, if the CMY tone values to be recorded in the color conversion table are recorded as 2 byte data, we can also anticipate a significant increase in the capacity required to store the color conversion table as well.

The invention of this application was completed based on knowledge and considerations such as those explained above, and the structure described above is used. If the invention of this application is applied to an image display device that can form dots that do not show clearly such as small dots or light dots, due to the reasons explained hereafter, the potential performance of an image display device can be drawn out, making it possible to easily display images of high image quality.

For the image processing apparatus and image processing method of this application described above, when said first image data is color converted to said second image data, in a preset tone range for which at least the smallest dots are formed, color conversion is done to image data for which tone values are increased proportionally. If we explain based on the previously described example using FIG. 22, when RGB image data is color converted to image data of each CMY color, in the highlight areas where small dots or light dots are formed, at least the tone values of each CMY color are converted to larger value tone values. Instead of increasing the resolution of the image data of each CMY color, if the tone values of each CMY color are converted to larger values, then it is possible to supplement the resolution insufficiency. Also, in the highlight area, smaller values are used for the tone values of each CMY color, so even when converted to larger value tone values, it is possible to keep from exceeding a tone value of 255.

When first image data is converted to second image data for which the tone value has been increased proportionally in this way, color conversion is done to second image data for which the tone value has been proportionally increased with the tone value relationship of the data for said second image data kept in the same sequence. For example, by doing color conversion of first image data Da1 and Db1 without proportionally increasing the tone value, then da2 and db2 will be obtained, respectively. If there is a relationship of da2>db2 for these second image data, then the image data Da2 and Db2 obtained by color converting first image data Da1 and Db1 to second image data for which the tone value was proportionally increased will always be color converted so as to have a relationship of Da2>Db2.

In this manner, if second image data for which the tone value was proportionally increased while the tone value relationship was kept in the same sequence, said image data is converted to dot volume data for the various types of dots that can be formed by an image display device. At this time, considering the fact that the second image data tone value is proportionally increased, the dot volume data is converted while eliminating the concerned proportional increase. As described previously, second image data for which the tone value is proportionally increased has the tone value relationship between image data kept the same, so accurate dot volume data can be obtained by suitably eliminating the proportional increase of the tone value.

By using this kind of method, even in a specific tone value range for which the smallest dots with the smallest tone value expressed per single dot is formed, it is possible to obtain dot volume data that ensures the necessary resolution. If dots are formed based on dot volume data obtained in this way, the potential performance held by an image display device is drawn out, making it possible to express images of high image quality for which fine level tone changes are suitably expressed.

With the concerned method, by proportionally increasing the tone value of the second image data instead of increasing the resolution of the second image data, the resolution insufficiency is supplemented. Therefore, there is also no risk of increasing the image data volume as happens in a case when the resolution of the second image data is actually increased.

For the image processing apparatus described above, it is also possible to correlate sets of various tone values of said first color coordinate system and the sets of tone values of each color of a second color coordinate system for which said tone values are proportionally increased, to record these in a proportionally increased color conversion table, and to convert said first image data to second image data for which said tone values have been proportionally increased by referencing the concerned proportional increase color conversion table.

If this type of proportionally increased color conversion table is referenced, it is possible to quickly convert first image data to second image data for which tone values have been proportionally increased, and this is optimal. Also, if the concerned method is used, there is also the advantage that if the tone values of the second image data set in the color conversion table are simply changed to tone values which have been proportionally increased, it is possible to color convert first image data to second image data for which the tone values have been proportionally increased without doing any kind of special processing.

For the image processing apparatus described above, it is also possible to correlate with respect to each color of said second color coordinate system the tone values of second image data for which said tone values are proportionally increased and dot volume data for each of said various types of dots for which said proportional increase is eliminated, to record this in a corrected dot volume table, and to convert second image data for which said tone values have been proportionally increased into dot volume data of each type of dot for which said proportional increase is eliminated for each color of said second color coordinate system by referencing the concerned corrected dot volume table.

If this kind of corrected dot volume table is referenced, it is possible to quickly convert second image data for which the tone values have been proportionally increased into dot volume data for each type of dot for which said proportional increase has been suitably eliminated. Also, if this method is used, by simply setting dot volume data for each type of dot set in the dot volume table to a suitable value, there is also the advantage of being able to eliminate the proportional increase part of the second image data and obtain suitable dot volume data without performing any kind of special processing.

For the image processing apparatus described above, it is also acceptable to perform color conversion after adding a specified proportional increase to the tone values of first image data as described hereafter. Specifically, at least in a specific tone value range in which said smallest dots are formed, the tone values of said first image data is proportionally increased so as to proportionally increase the tone values of said second image data, with the tone value relationship between said second image data kept the same. In this way, it is also acceptable to obtain second image data for which said tone values have been proportionally increased, by color converting the proportionally increased first image data into said second image data.

In this way, if color conversion is done after proportionally increasing the first image data, it is possible to convert said first image data into second image data for which the tone values have been proportionally increased without changing the color conversion table.

For the image processing apparatus described above, said smallest dots can be made the dots of the smallest size of the dots that are formed, and to do color conversion of second image data for which said tone values have been proportionally increased in a preset tone range in which such the smallest size dots are formed. Alternatively, it is also possible to have the dots with the lowest concentration of the dots that are formed be said smallest dots, and to do color conversion of second image data for which said tone values have been proportionally increased in a preset tone range in which such the lowest concentration dots are formed.

Dots of the smallest size of the dots that are formed, or dots with the lowest dot concentration have a small tone value expressed per single dot, so in the preset tone range in which these smallest dots are formed, if the first image data is converted to second image data for which the tone values have been proportionally increased, it is possible to perform optimal supplementation of the resolution of the second image data.

For the image processing apparatus described above, it is also acceptable to take as the image data of said first color coordinate system the tone values of each color at least including the three primary colors of light, and to convert said image data into said dot volume data for each color at least including the three primary colors of ink.

In many cases, color image data is supplied as image data of colors including red, green, and blue which are the three primary colors of light, and in many cases, when the color image is printed, printing is done by forming dots of colors including at least cyan, magenta, and yellow which are the three primary colors of ink. Therefore, it is preferable that the image processing apparatus be able to be broadly applied to color image printing.

Also, for the image processing apparatus described above, it is possible to use a structure like that described hereafter. Specifically, sets of various tone values of a first color coordinate system and the sets of tone values of each color of a second color coordinate system are correlated and recorded in advance in a color conversion table. When converting image data, by performing a specific conversion on a prerecorded color conversion table, a proportionally increased color conversion table is generated for which combinations of the various types of tone values of said first color coordinate system and combinations of the tone values of each color of a second color coordinate system for which said tone values have been proportionally increased are correlated and recorded. It is also possible to do color conversion of image data of the first color coordinate system into image data of the second color coordinate system for which said tone values have been proportionally increased while referencing a proportionally increased color conversion table generated in this manner.

When performing a specified conversion on a color conversion table, as a result of data being rounded off due to insufficient resolution for the image data of the second color coordinate system, errors are included in the obtained color conversion table, making it difficult to obtain accurate dot volume data. In comparison to this, if the color conversion table is converted to said proportionally increased color conversion table, it is possible to supplement even when there is insufficient resolution for the image data of the second color coordinate system, making it possible to obtain accurate dot volume data, which is preferable.

For a proportionally increased color conversion table generated by an image processing apparatus in this way, it is also possible to use the proportionally increased color conversion table which has at least different part of the sets of various tone values of the first color coordination system from the set of tone values of the first color coordinate system that forms the prerecorded color conversion table.

When generating from a color conversion table a new color conversion table that includes new sets of various tone values of a first color coordinate system that is not in the original table, errors will occur due to rounding of data in the image data of the second color coordinate system that corresponds to said new sets of various tone values. In light of this, in such a case, if the newly generated color conversion table is made as a color conversion table for which the tone values are proportionally increased, even when the resolution for the image data of the second color coordinate system is insufficient, it is possible to obtain accurate dot volume data by supplementing this.

Alternatively, it is also possible to have the proportionally increased color conversion table generated by an image processing apparatus in this way be a table for which the sets of various tone values of the first color coordinate system that forms the table be formed from multiple sets rather than from sets of the tone values of the first color coordinate system that forms the prerecorded color conversion table.

When generating a color conversion table formed by multiple sets rather than by sets of tone values of the first color coordinate system, image data of the second color coordinate system corresponding to the newly added sets are calculated. If the resolution for the image data of the second color coordinate system is insufficient, errors may occur due to rounding of the data in the image data calculated from these. In light of this, in such a case, if the newly generated color conversion table is made to be a color conversion table for which the tone values are proportionally increased, even if the resolution for the image data of the second color coordinate system is insufficient, it is possible to obtain accurate dot volume data by supplementing this, so this is preferable.

It is also possible to suitably apply the image processing apparatus of the present invention to a printing control apparatus that controls a printing unit by outputting printing data for controlling dot formation to a printing unit that prints a color image by forming various dots of differing tone values expressed per single dot using ink of various colors on a printing medium. Specifically, the image processing apparatus described above can receive image data expressed by a first color coordinate system and convert to dot volume data according to a second color coordinate system with the resolution kept as is. Therefore, if the concerned image processing apparatus is applied to a printing control apparatus that controls a printing unit which can form various types of dots with different tone values expressed per single dot, it is possible to draw out the performance of the printing unit and to print color images of high image quality.

Also, the present invention can be realized using a computer by reading into the computer a program that realizes the image processing method described above. Therefore, the present invention also includes an aspect as a recording medium as described hereafter. Specifically, the recording medium of the present invention that corresponds to the image processing method described above is as follow:

an recording medium in which a program is recorded in a computer readable manner, said program actualizing a method that converts image data expressed by sets of various tone values which express a color image into dot volume data related to dot formation density of various type dots which express different tone values per respective single dots, said program causing a computer to attain:

(A) a function of receiving first image data expressed by sets of various tone values of a first color coordinate system and converting the first image data into second image data expressed by sets of the tone values of each color which comprises a second color coordinate system; and (B) a function of converting said second image data into said dot volume data of said various type dots with respect to each color of said second color coordinate system, wherein said function (A) converts said first image data into second image data which are increased proportionally with the tone value relationship between said second image data kept in the same sequence, when said second image data is at least in a preset tone range where the smallest dots, which express the smallest tone value per respective single dots among the various type dots, are generated, and said function (B) converts said second image data of which said tone value is increased proportionally into said dot volume data corrected in order to eliminate said proportional increase.

If the various functions described above are realized using a computer by reading a program recorded on the concerned recording medium into that computer, then it is possible to draw out the potential performance of an image display device that can form small dots or light dots and to print images of high image quality.

Furthermore, the present invention can also understand a program that realizes the various image processing methods described above as a program described by text information. Specifically, the program that corresponds to the image processing method described above is:

a program for actualizing a method that converts image data expressed by sets of various tone values which express a color image into dot volume data related to dot formation density of various type dots which express different tone values per respective single dots, said program causing a computer to attain:

(A) a function of receiving first image data expressed by sets of various tone values of a first color coordinate system and converting the first image data into second image data expressed by sets of the tone values of each color which comprises a second color coordinate system; and (B) a function of converting said second image data into said dot volume data of said various type dots with respect to each color of said second color coordinate system, wherein said function (A) converts said first image data into second image data which are increased proportionally with the tone value relationship between said second image data kept in the same sequence, when said second image data is at least in a preset tone range where the smallest dots, which express the smallest tone value per respective single dots among the various type dots, are gerenated and said function (B) converts said second image data of which said tone value is increased proportionally into said dot volume data corrected in order to eliminate said proportional increase.

If the concerned program is executed on a computer, it becomes possible to draw out the potential performance of an image display device that can form small dots or light dots, so that images of high image quality can be printed.

BRIEF DESCRIPTION OF THE DRAWINGS

FIG. 3 is a schematic structural diagram of a printer as the image display device of the first embodiment.

FIG. 11 is an explanatory diagram that shows the principle of increasing the resolution of image data after color conversion by referencing a proportionally increased color conversion table.

BEST MODES OF CARRYING OUT THE INVENTION

To explain the effects and merits of the present invention more clearly, practical embodiments of the present invention are explained hereafter in the sequence shown below.

Figure 1:
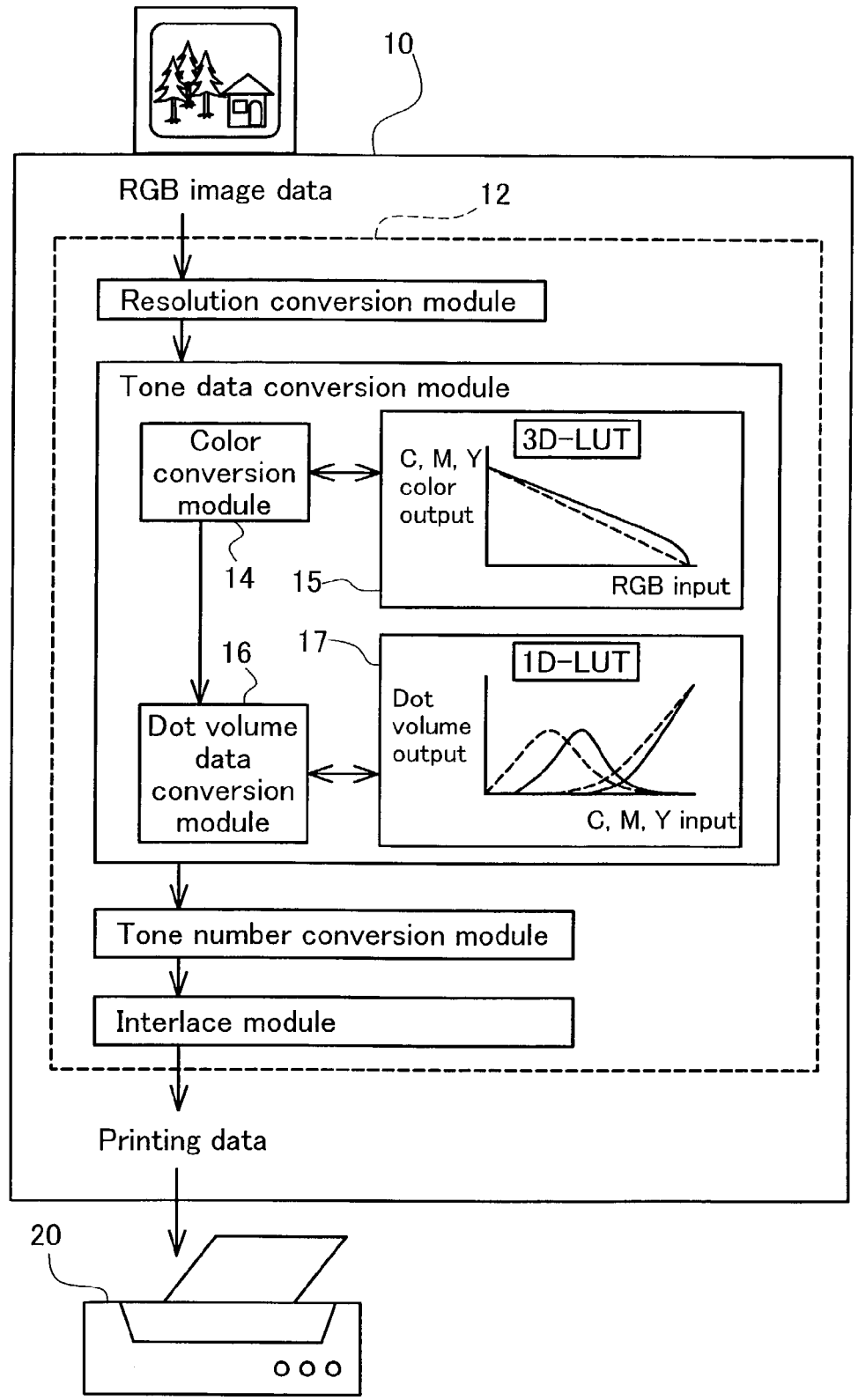
FIG. 1 is a schematic structural diagram of the printing system of a first embodiment.

A. Mode of Carrying Out Invention
B. First Embodiment
B-1. Device Structure
B-2. Image Data Conversion Processing for the First Embodiment
B-3. Setting Method for the Proportionally Increased Color Conversion Table
B-4. Setting Method for the Corrected Dot Volume Table
B-5. Variation of the First Embodiment
C. Second Embodiment
C-1. Image Data Conversion Processing for the Second Embodiment
C-2. Pre-Conversion Processing
C-3. Variation of the Second Embodiment A. Mode of Carrying Out Invention:

One mode of carrying out the present invention is discussed below with reference to FIG. 1. FIG. 1 is an explanatory diagram for conceptually explaining the summary of the present invention using a printing system as an example. This printing system is composed of computer 10 as an image processing apparatus and color printer 20, etc. When computer 10 receives tone image data of an RGB color image from an image apparatus such as a digital camera or color scanner, the image data is converted to printing data expressed by whether or not various color dots are formed which can be printed by color printer 20. The conversion of the concerned image data is performed using a dedicated program called printer driver 12. Moreover, the tone image data of the RGB color image can also be created by computer 10 using various types of application programs.

Printer driver 12 is composed of multiple modules including a resolution conversion module, a tone data conversion module, a tone number conversion module, and an interlace module. The tone data conversion module receives RGB image data and converts it to dot volume data equivalent to the dot density for the various dots that can be formed by color printer 20. As shown conceptually in FIG. 1, the tone data conversion module is composed of two modules, a color conversion module 14 and a dot volume data conversion module 16.

Color conversion module 14 converts to image data of each color of cyan (C), magenta (M), and yellow (Y) which are the colors of dots that can be formed by color printer 20, by performing color conversion on image data expressed by the colors RGB. The concerned color conversion can be performed quickly by referencing a three dimensional numerical table called color conversion table 15. In other words, in color conversion table 15, tone values of each color C, M, and Y that correspond to combinations of the tone values of each color RGB are set, and it is possible to convert image data of each color RGB to image data of each color C, M, and Y by referencing this kind of color conversion table. In FIG. 1, the graph that displays RGB input on the horizontal axis and C, M, and Y color output on the vertical axis conceptually expresses the function of color conversion table 15 which is set to be able to obtain the tone values of the colors C, M, and Y by determining the combinations of the tone values of the colors RGB. Moreover, to avoid the explanation becoming complicated here, we used an example for which the tone values of each color C, M, and Y are set in the color conversion table, but it is also possible to set the tone values of black (K) in addition to the colors C, M, and Y. We will give a more detailed explanation of the color conversion module later.

Dot volume data conversion module 16 is a module that receives C, M, and Y color image data from color conversion module 14 and converts it to data that is equivalent to the density at which dots should be formed for each type of dot that can be formed by color printer 20. Color printer 20 is able to form small dots in addition to the normal large dots to be able to print images of high image quality for which the dots do not show clearly. Here, these respective dots will be referred to as large dots and small dots. When dot volume data conversion module 16 receives the C, M, and Y color image data, it converts this to dot volume data for small dots and large dots for each color according to the tone values of the image data. This type of conversion can be performed quickly by referencing the one dimensional numerical table called dot volume table 17. In other words, a dot volume equivalent to the dot density of small dots and large dots corresponding to the tone values of the image data is set for each color C, M, and Y in dot volume table 17, and by referencing this kind of table, it is possible to convert image data to dot volume data of small dots and large dots for each color. In FIG. 1, the graph that shows C, M, and Y input on the horizontal axis and dot volume output on the vertical axis conceptually expresses the function of this kind of dot volume table 17. Moreover, to avoid the explanation becoming complicated here, we made it possible for color printer 20 to form two types of dots, small dots and large dots, but it is of course also possible to form more types of dots. We will give a more detailed explanation of the dot volume data conversion module later.

By working as described above, image data converted to dot volume data by a tone data conversion module undergo further specified conversions by the tone number conversion module and the interlace module to be converted to printing data. Each of these modules will be described later. Color printer 20 prints color images by forming ink dots of each color on a printing medium based on printing data obtained in this way.

Color printer 20 can form small dots in addition to large dots, so for that part, it is possible to express fine level tone changes. However, with the resolution of the image data of each color CMY obtained by color converting RGB image data left as is, there are cases when it is not possible to sufficiently exhibit the performance of a printer that can express fine level tone changes by forming small dots. In other words, to avoid the image data from becoming larger than necessary, the resolution of the image data of each color CMY obtained with the color conversion module is set to a sufficient resolution with normal size dots (large dots for this explanation) as a standard. In this type of situation, even if the resolution that can be expressed by forming small dots is greatly increased, it is not possible to express fine level tone changes greater than the resolution of the CMY color image data.

In comparison to this, the color conversion table 15 that color conversion module 14 references for this embodiment has the tone values of the colors CMY set to slightly larger values in the highlight area that are the tone values for which the RGB image data is large. With color conversion table 15 of FIG. 1, the CMY tone values set to larger values in relation to the RGB image data are shown conceptually by a solid line. Small dots are mainly formed in the highlight area, so this is an area where insufficient resolution of the image data shows up easily. In light of this, in this type of area, instead of increasing the resolution, the insufficient resolution is supplemented by converting to larger image data. Next, when converting the image data of each color C, M, and Y to dot volume data for small dots and large dots, taking into consideration that the image data will be converted to larger values, the data is converted to smaller dot volume data to correct this. With the dot volume table 17 shown in FIG. 1, the dot volume data set to smaller values in relation to the C, M, and Y color image data is shown conceptually by a solid line. For reference, dot volume data set to normal values is shown by a dotted line.

In this way, in areas where mainly small dots are formed, the resolution insufficiency is supplemented by performing color conversion with the image data proportionally increased, and next, if the proportionally increased part of the image data is eliminated when converting to dot volume data, it is possible to make use of small dots and to express fine level tone changes. The concerned method can be realized easily simply by changing the setting values of the color conversion table and the dot volume table. Of course, there is not the problem of the image data becoming large as happens when increasing the resolution of the image data. Following, we will give a detailed explanation of the method of converting image data in this way based on embodiments.

B. First Embodiment

B-1. Device Structure

Figure 2:
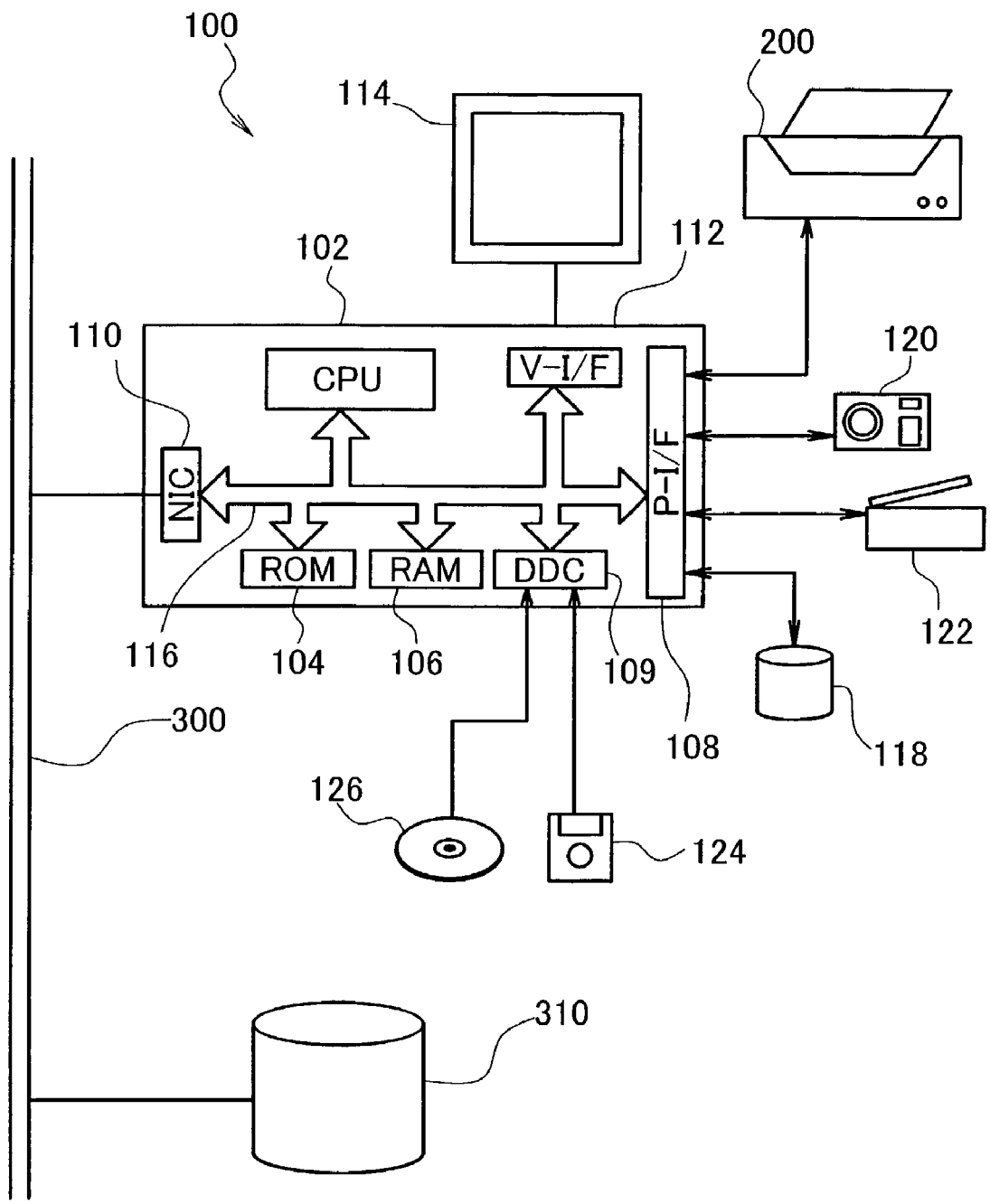
FIG. 2 is an explanatory diagram that shows the structure of a computer as the image processing apparatus of the first embodiment.

FIG. 2 is an explanatory diagram that shows the structure of computer 100 as the image processing apparatus of the first embodiment. Computer 100 is a commonly known computer formed with CPU 102 at the center with items such as ROM 104 and RAM 106 connected to each other by bus 116.

Connected to computer 100 are items such as disk controller DDC 109 for reading data of flexible disk 124 or compact disk 126, peripheral device interface P-I/F 108 for receiving data of peripheral devices, and video interface V-I/F 200 for driving CRT 114. Connected to P-I/F 108 are items such as color printer 200 and hard disk 118 to be described later. Also, if items such as digital camera 120 and color scanner 122 are connected to P-I/F 108, it is also possible to print images fetched by digital camera 120 and color scanner 122. Also, if network interface card NIC 110 is installed, it is also possible to connect computer 100 to communication line 300 and to fetch data recorded in recording device 310 that is connected to the communication line.

FIG. 3 is an explanatory diagram that shows the schematic structure of color printer 200 of the first embodiment. Color printer 200 is an inkjet printer that can form dots of four colors of ink including cyan, magenta, yellow, and black. Of course, in addition to these four colors of ink, it is also possible to use an inkjet printer that can form dots of ink of a total of six colors including a cyan ink with low pigment concentration (light cyan) and magenta ink with a low dye concentration (light magenta). Moreover, hereafter, in some cases, cyan ink, magenta ink, yellow ink, black ink, light cyan ink, and light magenta ink are abbreviated as C ink, M ink, Y ink, K ink, LC ink, and LM ink.

As shown in the illustration, color printer 200 is composed of a mechanism that drives ink head 241 that is placed in carriage 240 to spray ink and form dots, a mechanism that sends this carriage 240 back and forth in the axial direction of platen 236 using carriage motor 230, a mechanism that transports printing paper P using paper feed motor 235, and a control circuit 260 that controls dot formation, movement of carriage 240, and transport of printing paper.

Installed in carriage 240 is an ink cartridge 242 that holds K ink and an ink cartridge 243 that holds various inks including C ink, M ink, and Y ink. When ink cartridge 242 and 243 are installed in carriage 240, each ink in the cartridges is supplied to ink spray heads 244 through 247 for each color provided at the bottom surface of printing head 241 through an introduction pipe that is not shown in the figure. One set each of 48 nozzles Nz in nozzle rows arranged at a fixed nozzle pitch k are provided in the ink spray heads 244 through 247 for each color.

Control circuit 260 is formed from items such as CPU 261, ROM 262, and RAM 263, and in addition to controlling main scans and sub scans of carriage 240 by controlling the operation of carriage motor 230 and paper feed motor 235, ink drops are sprayed at a suitable timing from each nozzle based on printing data supplied from computer 100. In this way, under the control of control circuit 260, color printer 200 can print color images by forming dots of ink of each color at suitable positions on a printing medium.

Moreover, it is possible to apply various methods for the method of spraying ink drops from the ink spray heads of each color. Specifically, it is possible to use methods such as a method of spraying ink using a piezo element, or a method of generating bubbles within an ink path using a heater placed in the ink path and then spraying ink drops. Also, instead of spraying ink, it is also possible to use a printer that uses a method such as forming ink drops on printing paper using a phenomenon such as heat transfer or a method that adheres various colored toner powder onto a printing medium using static electricity.

Figure 4A:
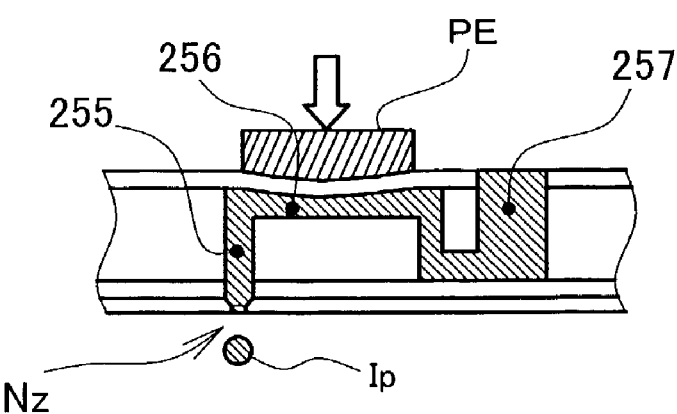
FIG. 4 is an explanatory diagram that shows the principle of the printer of the first embodiment forming dots of different sizes.

By controlling the size of ink drops that are sprayed, color printer 200 can control the size of ink dots formed on the printing paper. Following, we will explain a method of forming ink dots of different sizes using color printer 200, but as preparation for this, first, we will explain the internal structure of the nozzles that spray the various colored inks. FIG. 4(a) is an explanatory diagram that shows the internal structure of the nozzles that spray various colored inks. A plurality of this kind of nozzle is provided in various color ink spray heads 244 through 247. As shown in the figure, provided on each nozzle is an ink path 255, an ink chamber 256, and a piezo element PE on the ink chamber. When ink cartridges 242 and 243 are installed in carriage 240, the ink inside the cartridges is supplied to ink chamber 256 via ink gallery 257. Piezo element PE is an element that performs electromechanical energy conversion at very high speeds by distortion of a crystal structure when voltage is applied as is widely known. With the first embodiment, by applying voltage of a specified waveform between electrodes provided at both ends of piezo element PE, the side wall of ink chamber 256 is deformed. As a result, the capacity of ink chamber 256 decreases, and ink equivalent to the decreased portion of the capacity is sprayed from nozzles Nz after becoming ink drop Ip. By the ink drops Ip soaking into printing paper P that is installed on platen 236, ink dots are formed on the printing paper.

Figure 4B:
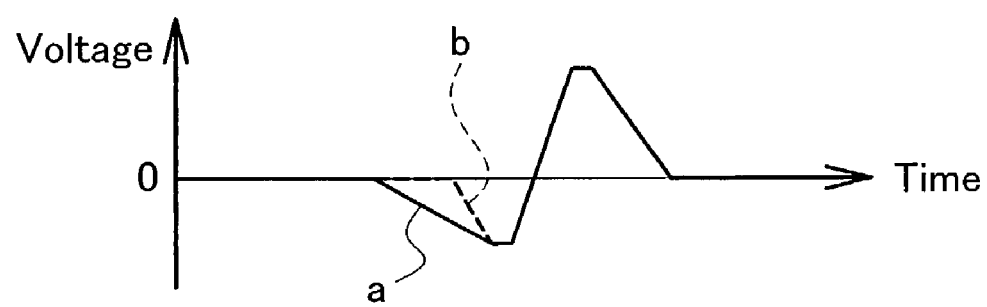

FIG. 4(b) is an explanatory diagram that shows the principle of changing the size of the ink drops that are sprayed by controlling the waveform of the voltage that is applied to piezo element PE. To spray ink drops Ip from a nozzle, a negative voltage is applied to piezo element PE, ink is once suctioned into ink chamber 256 from ink gallery 257, after which a positive voltage is applied to piezo element PE and the ink chamber capacity is decreased, so that ink drops Ip are sprayed. Here, if the suction speed of the ink is suitable, the inflow of ink is equivalent to the volume of change of the ink chamber capacity, but if the suction speed is too fast, then the inflow of ink from ink gallery 257 will not be sufficient because there is path resistance between ink gallery 257 and ink chamber 256. As a result, the ink of ink path 255 backflows within the ink chamber, and the ink interface near the nozzle recedes significantly. In FIG. 4(b), the voltage waveform a shown by a solid line shows the waveform of ink suctioned at a suitable speed, and voltage waveform b shown by the dotted line shows an example of a waveform of suctioning at a higher speed than the suitable speed.

In a state with sufficient ink supplied into ink chamber 256, when positive voltage is applied to piezo element PE, a volume of ink drops Ip equivalent to the decrease in the capacity of ink chamber 256 is sprayed from nozzle Nz. In contrast to this, when a positive voltage is applied in a state when the ink supply volume is insufficient and the ink interface has greatly receded, the sprayed ink drops will be small ink drops. In this way, with color printer 200 of the first embodiment, by controlling the waveform of the negative voltage applied before spraying the ink drops and changing the ink suction speed, it is possible to control the size of the sprayed ink drops and to form two types of ink dots, large dots and small dots.

Of course, it is also possible to form many types of dots, without being limited to two types. Furthermore, it is also possible to control the size of the ink dots formed on the printing paper using a method of controlling the number of ink drops that are sprayed.

With a color printer 200 that has a hardware structure like that described above, by driving carriage motor 230, each color ink spray heads 244 through 247 are moved in the main scan direction in relation to printing paper P, and by driving paper feed motor 235, printing paper P is moved in the sub scan direction. Control circuit 260, while repeating main scans and sub scans of carriage 240 according to the printing data, drives the nozzles at a suitable timing and sprays ink drops, and this is how color printer 200 prints a color image on printing paper.

B-2. Image Data Conversion Processing for the First Embodiment

Figure 5:
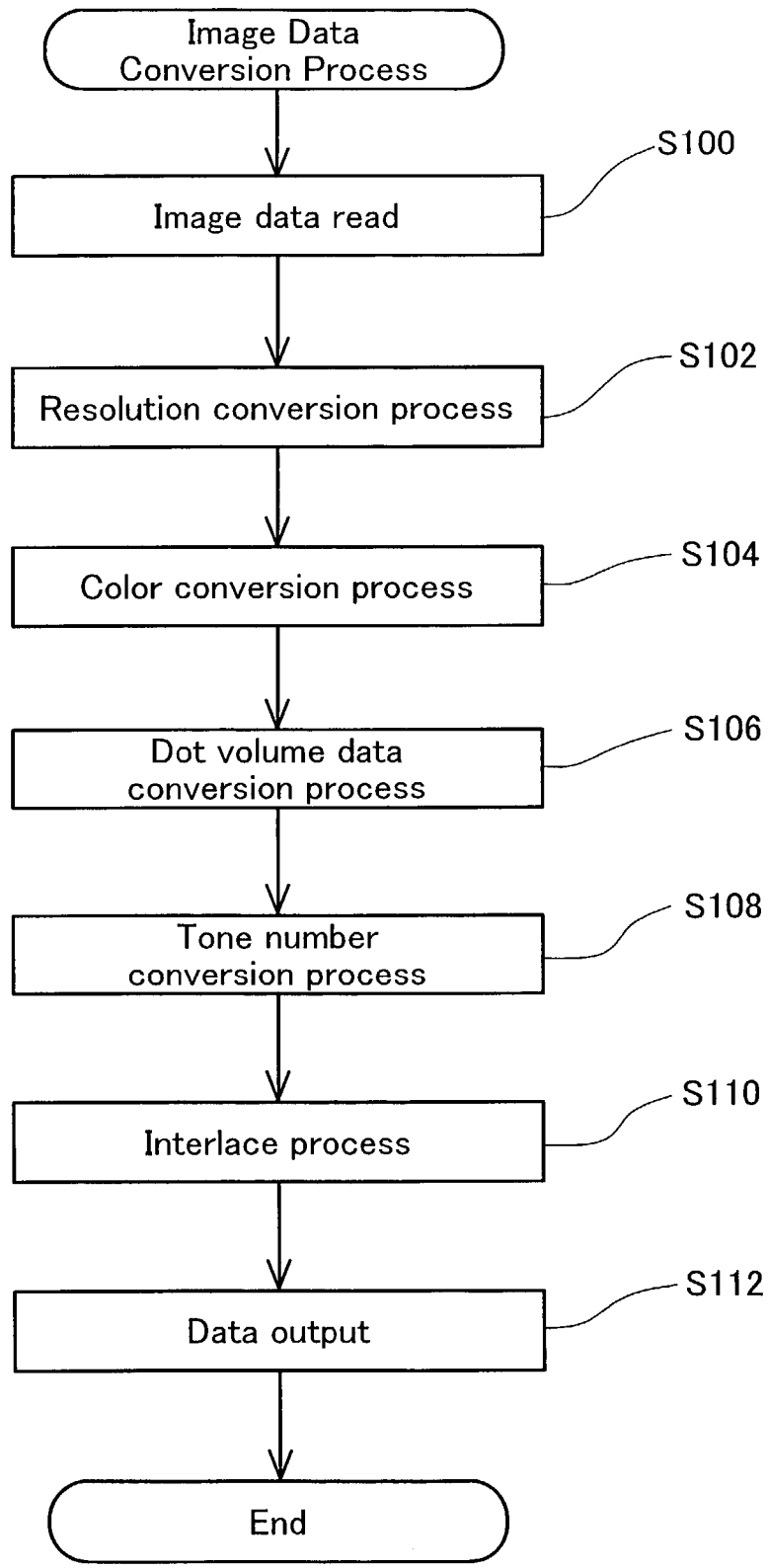
FIG. 5 is a flow chart that shows the flow of the image data conversion process that is performed by the image processing apparatus of the first embodiment.

FIG. 5 is a flow chart that shows the flow of the process of computer 100 as the image processing apparatus of the first embodiment converting received image data to printing data by adding specified image processing to it. The concerned process starts by the operating system of computer 100 activating printer driver 12. Following, we will give a brief explanation about the image data conversion process of the first embodiment according to FIG. 5.

When the image data conversion process starts, first, printer driver 12 starts reading the RGB color image data to be converted (step S100). Next, the resolution of the fetched image data is converted to the resolution for color printer 200 to print at (step S102). When the resolution of the color image data is lower than the printing resolution, new data is generated between adjacent image data by performing linear interpolation, and conversely when it is higher than the printing resolution, the resolution of the image data is converted to the printing resolution by culling data at a fixed ratio.

When the resolution is converted in this manner, color conversion processing is performed on the color image data (step S104). Color conversion processing means the process of converting the color image data expressed by combinations of R, G, and B tone values to image data expressed by combinations of tone values of each color used by color printer 200 such as C, M, Y, and K. The color conversion process can be performed quickly be referencing the three dimensional numerical chart called a color conversion table.

Figure 6:
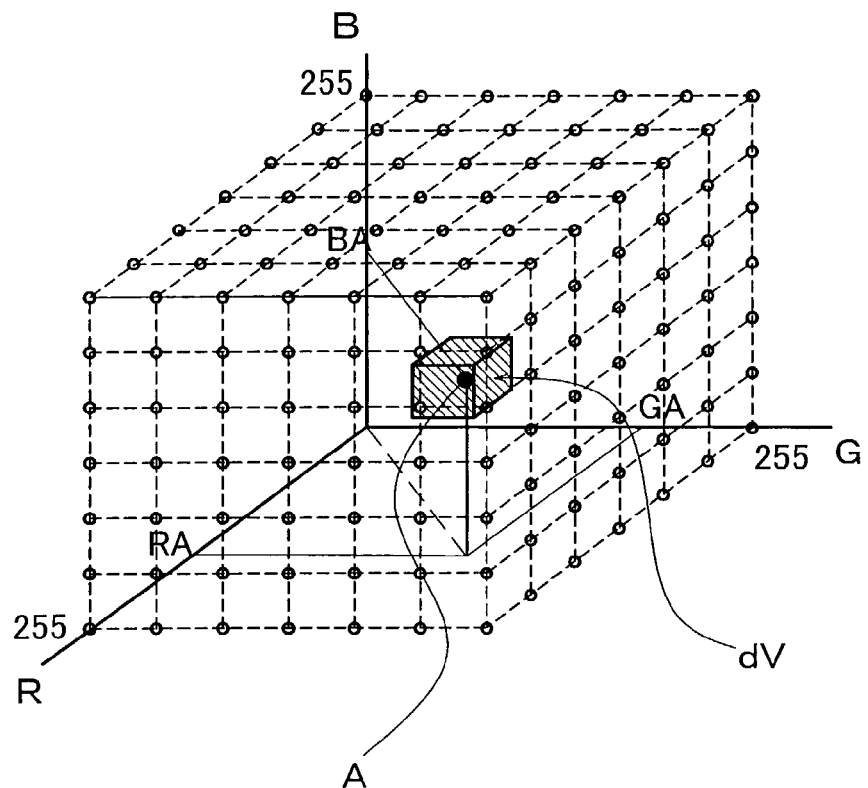
FIG. 6 is an explanatory diagram that conceptually shows the principle of performing color conversion while referencing a color conversion table.

As shown conceptually in FIG. 6, the color conversion table can be thought of as a three dimensional numerical chart on which is recorded the tone values of each color such as C, M, Y, and K at each grid point shown by combinations of the tone values of the colors RGB. In this way, the space taken by the three axes for which the tone values of each color are orthogonal to each other is called the color space. Also, when each tone value of each color uses a range from minimum value to maximum value, the solid formed within the color space is called the color solid. Moreover, the tone values of each color set at each grid point of the color conversion table are not limited to being tone values of the colors C, M, Y, and K, but can also be set to tone values of three colors such as C, M, and Y, and the tone values of each color C, M, Y, and K can be obtained by performing a process called ground color removal on the tone value data of the colors C, M, and Y obtained by color conversion. Alternatively, in addition to C, M, Y, and K color dots, with a color printer that can also form LC and LM dots, it is also possible to set the tone values for these six colors.

With color conversion processing, by performing an interpolation operation when necessary while referencing this type of color conversion table, image data expressed by RGB tone values is color converted to image data expressed by the tone values of each color C, M, Y, and K. Explaining briefly while referring to FIG. 6, for example when the tone values of each color RGB are RA, GA, and BA, considering point A of the coordinate values (RA, GA, BA) in the RGB color space, a small cube dV that would contain point A is found. Next, the tone values of each color C, M, Y, and K set at the grid points that are the vertices of cube dV are read, and by doing an interpolation operation from these tone values, the tone value of point A is calculated.

In the image processing of the first embodiment, the image data of each color C, M, Y, and K is expressed as 8-bit data, and the resolution is insufficient for expressing fine level tone changes such as those that can be expressed using small dots. In light of this, with the color conversion processing of the first embodiment, the insufficient resolution is supplemented by referencing a color conversion table for which the tone values of each color are set to larger values. We will describe the method of setting this kind of color conversion table later.

When this color conversion processing ends, dot volume data conversion processing starts (step S106 in FIG. 5). The dot volume data conversion process is a process of converting image data to dot volume data that shows the dot density for each type of dot that can be formed by a printer on printing paper. With color printer 200 of the first embodiment, in correspondence to the fact that it is possible to form two types of dots, small dots and large dots, with the dot volume data conversion process of step S106, the image data of each color obtained by color conversion processing is converted to dot volume data that shows the dot density for each dot, the small dots and large dots. The concerned conversion is performed by referencing a dot volume table like that shown in FIG. 7.

Figure 7:
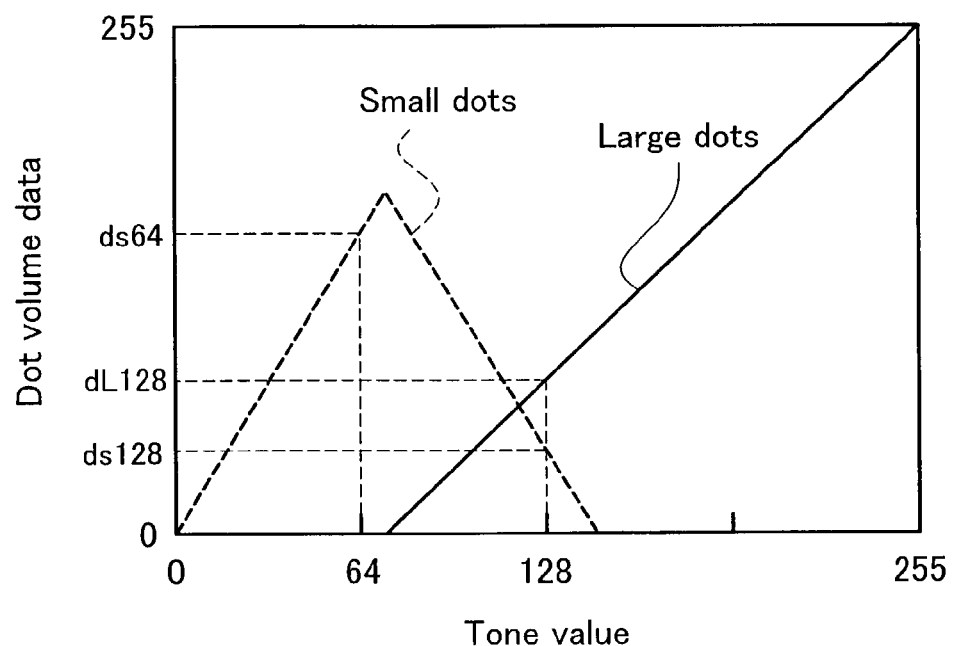
FIG. 7 is an explanatory diagram that shows the principle of converting image data to dot volume data while referencing a corrected dot volume table.

As shown in FIG. 7, data relating to dot density for small dots and large dots is set for the tone values for each color C, M, Y, and K. What we refer to as dot density here is the density of dots formed in the pixels within a certain area. For example, a dot volume data value of 0 shows a state when absolutely no dots are formed. A dot volume data value of 128 shows a state when dots are formed in about half the pixels, and a dot volume data value of 255 shows a state when dots are formed in all pixels.

The dot volume table is set as follows for the tone values of each color. Explaining an example when the C color image data is converted, when the input tone value is 0, 0 is set for the dot volume data values of both small dots and large dots. In a state with a dot volume data of 0, absolutely no dots are formed, so the ground color of the paper shows up as is on the printing paper. When the input tone value is increased, the small dot density gradually increases, and along with this, for the hue expressed on the printing paper as well, the cyan color gradually changes from the ground color of the paper. When the input tone value exceeds a specified value, the dot density of the small dots turns to a decrease, and large dots start to be formed in place of the small dots. In this way, if small dots are replaced by large dots, the hue expressed on the printing paper gradually becomes a darker cyan color. When the input tone value reaches a specified value, all the small dots are replaced by large dots, and as the input tone value increases thereafter, the dot density of large dots also increases, and in due time the dot volume data value reaches 255, achieving a state where large dots are formed for all pixels. In this way, the dot volume table is set so that the color expressed on the printing paper gradually changes to a darker cyan color as the input tone value increases. Moreover, as described previously, with the color conversion processing of the first embodiment, to supplement the insufficient resolution of the image data, the tone values of each color C, M, Y, and K are converted to larger values. To supplement this, in the dot volume table of the first embodiment, smaller values are set as dot volume data of small dots and large dots for the input tone values. We will describe the method of setting this kind of dot volume table later.

By setting as described above, when the color conversion process and dot volume data conversion process ends, next the tone number conversion process starts (step S108 in FIG. 5). The tone number conversion process is the process described hereafter. RGB image data is converted to dot volume data that shows the dot density to be formed on printing paper for large dots and small dots of each color C, M, Y, and K through color conversion processing and dot volume data conversion processing. These dot volume data are expressed as data having 256 tones ranging form tone value 0 to 255. In comparison to this, color printer 200 of the first embodiment is able to form two types of dots, both large and small, for each color, but if we focus on the types of each dot the only state that can be used is either "dots are formed" or "dots are not formed." In light of this, dot volume data that has 256 tones for each type of dot must be converted to image data expressed by two tones that can be expressed by color printer 200. The process that performs this kind of tone number conversion is the tone number conversion process. The most commonly used method for the method of performing the tone number conversion process is the error diffusion method, but other known methods such as systematic design methods can of course also be used.

When the tone number conversion process ends in this way, the printer driver starts the interlace process (step S110). The interlace process is a process of realigning the image data expressed in a format based on the dot on-off state in the sequence in which it is to be sent to color printer 200 while considering the dot formation sequence. The printer driver outputs the image data ultimately obtained by performing interlace processing to color printer 200 as printing data (step S112). Color printer 200 forms each color ink dots on the printing paper according to the printing data. As a result, a color image corresponding to the image data is printed on the printing paper.

As described above, with the image processing apparatus of the first embodiment, color conversion is performed while referencing a color conversion table which is set so as to supplement the insufficient resolution of the image data of each color C, M, Y, and K. The image data of each color C, M, Y, and K obtained in this way is converted to larger tone values in the highlight area in order to supplement the insufficient resolution. Here, for the dot volume data conversion process that is performed next, the image data of each color C, M, Y, and K is converted to dot volume data of large dots and small dots for each color while referencing a dot volume table set so as to supplement this. If this is done, then it is possible to obtain suitable dot volume data with the image data of each color C, M, Y, and K left as is as 8-bit data and without reducing the resolution when doing color conversion. As a result, with color printer 200, by making use of small dots, it is possible to print images of high image quality corresponding to fine level tone changes of RGB image data.

Also, with the concerned method, with the color conversion process or the dot volume data conversion process, though special values are set in the color conversion table or dot volume table referenced for these processes, there is nothing special about the conversion process procedures themselves. In other words, by simply changing the color conversion table and dot volume table to the tables of the first embodiments, it is possible to print images of high image quality that express fine level tone changes by making use of small dots. In light of this, following we will explain the method of setting this proportionally increased color conversion table and corrected dot volume conversion tables.

B-3. Setting Method for the Proportionally Increased Color Conversion Table

The proportionally increased color conversion table can be set easily by changing the image data of the colors CMYK set at the grid points of the color conversion table. Following, we will explain the method of setting a proportionally increased conversion table by using an encoding coefficient Ke on the image data set in the color conversion table.

Figure 8:
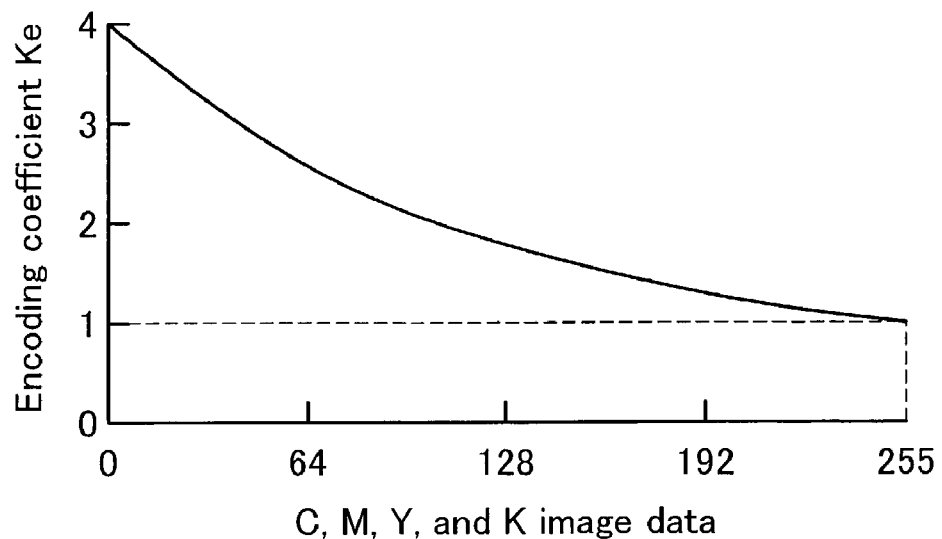
FIG. 8 is an explanatory diagram that shows an example of an encoding coefficient used in the first embodiment.
Figure 9:
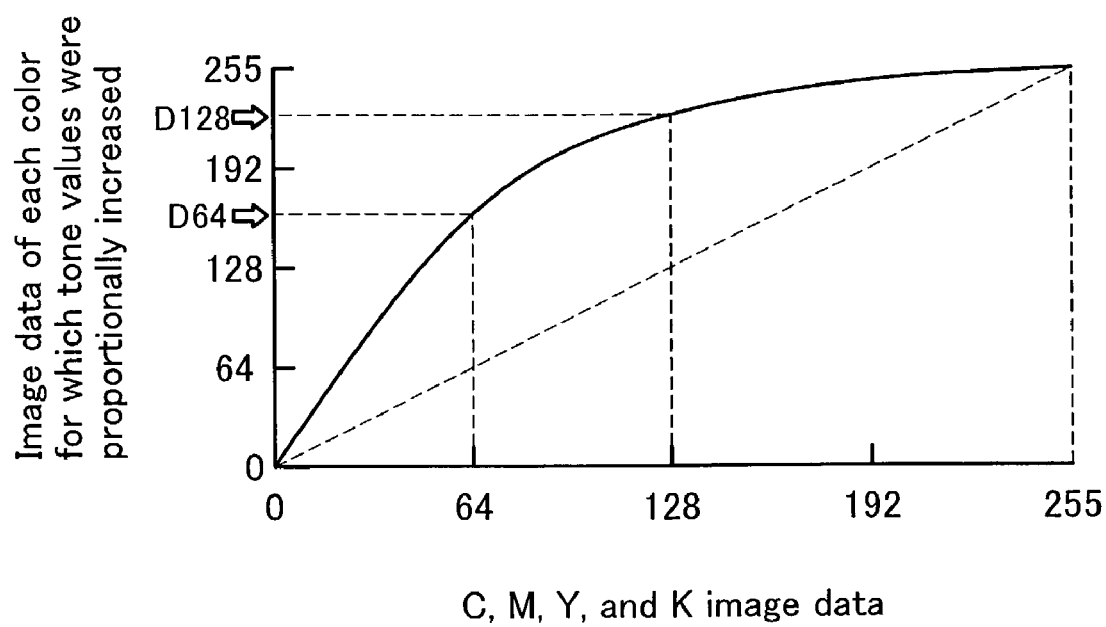
FIG. 9 is an explanatory diagram that shows the situation of the tone values of image data being proportionally increased by making use of the encoding coefficient.

FIG. 8 is an explanatory diagram that shows an example of an encoding coefficient. Encoding coefficient Ke is set for the tone values of the image data, and by multiplying the image data of each color CMYK by the encoding coefficient Ke, image data for which the tone values have been proportionally increased is calculated. FIG. 9 shows the situation of the image data being multiplied by the encoding coefficient Ke to calculate the image data for which the tone values have been proportionally increased. Encoding coefficient Ke can be set freely in a range that satisfies the following two conditions so that the image data is suitably proportionally increased. Next, the maximum value of the proportionally increased image data is set so as not to exceed the maximum value of the image data. The encoding coefficient Ke shown in FIG. 8 is calculated using the formula:

$$Ke = 4/((data/255)+1)^{**}2 \qquad (1)$$

Here, "data" shows the image data tone value (1 byte data). Also, ** shows the exponential operator. The encoding coefficient Ke obtained from the above equation is set so that in areas that have small values for image data (specifically, the highlighted areas), image data is proportionally increased by about 4 times, and as the image data gets larger, the proportional increase volume decreases. By working in this way, when color conversion is done, in the highlight areas, it is possible to supplement insufficient resolution of the image data. When the tone value of the image data is 255, the value of the encoding coefficient Ke is 1, so the value of the proportionally increased image data is 255. Using this kind of encoding coefficient Ke, it is possible to set the proportionally increased color conversion table from a color conversion table.

Figure 10:
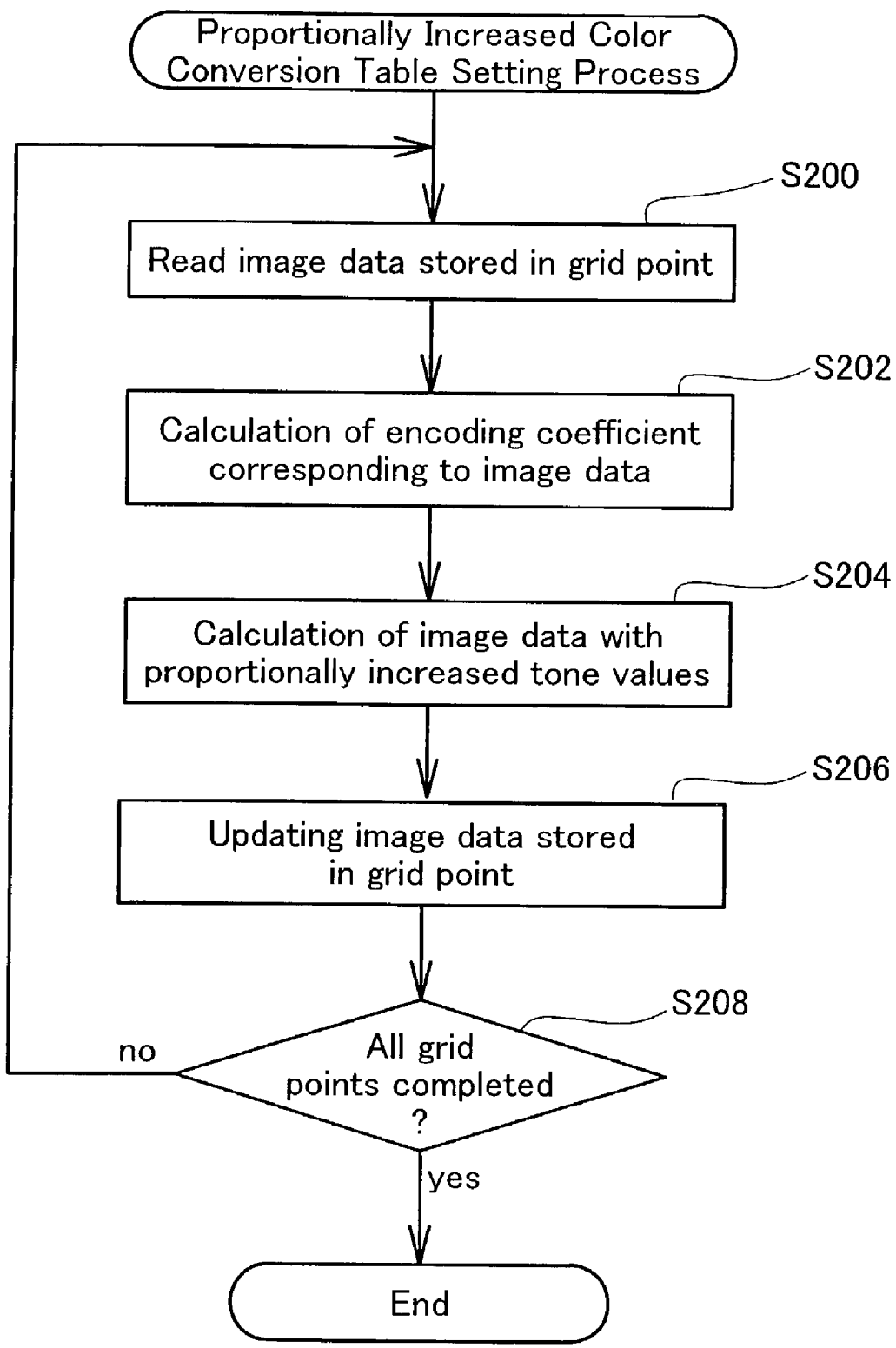
FIG. 10 is a flow chart that shows the flow of the process of setting a proportionally increased color conversion table.

FIG. 10 is a flow chart that shows the flow of the process of setting a proportionally increased color conversion table. Tone values for each color are set in the color conversion table as described previously and the following process is also performed for each color, but to avoid the explanation becoming complicated, we will explain hereafter without specifying colors.

When the process of setting the proportionally increased conversion table starts, first, the image data set at the grid points of the corrected color conversion table are read (step S200). As described previously, image data is recorded as 1 byte data, and the values used are integers from 0 to 255. Next, the encoding coefficient Ke corresponding to the read image data is calculated (step S202). Here, encoding coefficient Ke is calculated based on formula (1) above. Of course, it is also possible to calculate using another formula, or to obtain encoding coefficient Ke by referencing a numerical table in which suitable encoding coefficients Ke are correlated with image data in advance and recorded.

Next, by multiplying the read image data by the calculated encoding coefficient Ke, image data for which the tone values have been proportionally increased is calculated (step S204). Encoding coefficient Ke uses real numbers, so the proportionally increased image data is also obtained as a real number. After converting image data obtained in this way to an integer in the range of 0 to 255, the data set at the grid points of the color conversion table is updated using the obtained integer (step S206). The conversion to an integer is performed by discarding values less than a decimal point, for example.

By working as described above, when processing of one grid point ends, a judgment is made of whether the processing for all grid points has ended (step S208), and when there are still grid points that have not been processed, the system returns to step S200, and this series of processes is repeated until processing of all grid points is completed. In this way, when processing of all grid points is completed, the process of setting of the proportionally increased color conversion table is completed.

If RGB image data is color converted by referencing a proportionally increased color conversion table obtained in this way, it is possible to supplement the insufficient resolution of the CMYK image data in the highlighted areas. We will explain this while referring to FIG. 11.

Figure 22A:
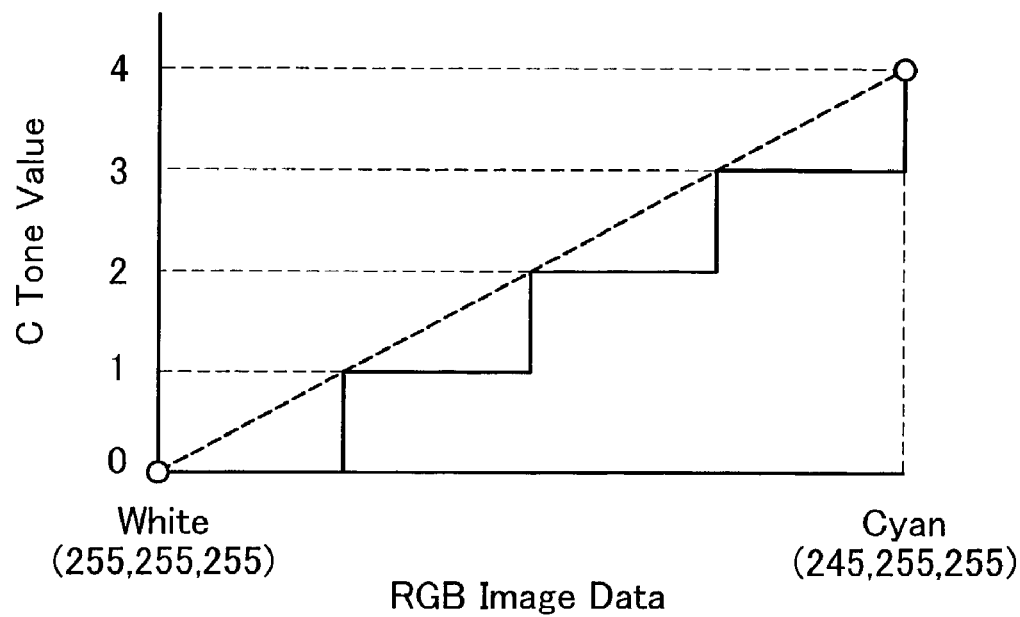
FIG. 22 is an explanatory diagram that explains the phenomenon of the image data resolution decreasing according to color conversion processing.
Figure 22B:
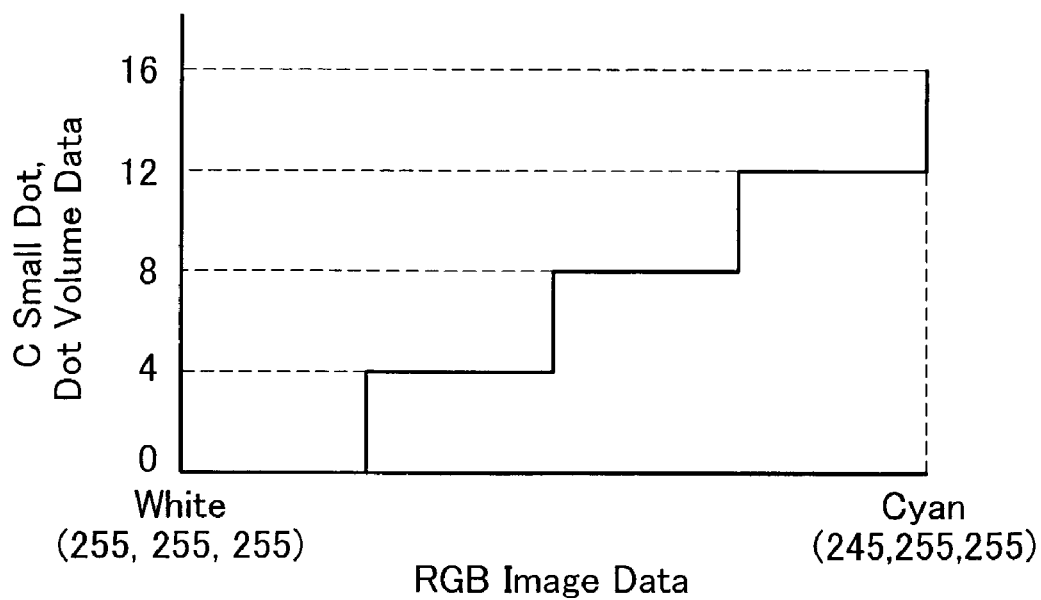

FIG. 11 is an explanatory diagram that conceptually shows the situation of color converting RGB image data for which white has been changed to cyan color. The space at the left that shows (R, G, B) shows the input values of the RGB image data. As explained using FIG. 22, the RGB image data (255, 255, 255) appears as white color, and the RGB image data (245, 255, 255) appears as cyan color. Also what is displayed enclosed by a dotted line in FIG. 11 is image data where the grid points of the color conversion table are. The tone values of each color CMYK are set at the grid points of the color conversion table. As described previously with FIG. 22, when color converting RGB image data for which white has been changed to cyan, it is sufficient to focus on the change in the C color tone value, so only the C color tone value is displayed in FIG. 11 as well.

The space at the right side of FIG. 11 where C_data is displayed shows the C color tone value set in the grid points of a normal color conversion table, in other words, a color conversion table for which an encoding coefficient is not used. Meanwhile, the space one to the left side where E_C_data is displayed shows the C color tone value set for the grid points of a proportionally increased color conversion table for which an encoding coefficient is used. The encoding coefficient was calculated using the formula (1) noted above.

As described previously, the RGB image data between grid points of the color conversion table is color converted to the tone values of the colors CMYK by interpolating the tone values set at the grid points. The C color tone values obtained by color converting the RGB image data between grid points using a proportionally increased color conversion table is shown in the E_C_data space. Interpolation is performed using linear interpolation, but it is also possible to use another known method. As is clear if we compare the data shown in the E_C_data space and the (R, G, B) space displayed at the left edge, as the RGB image data changes from (255, 255, 255) that shows as white to (245, 255, 255) that shows as cyan color, the value of E_C_data changes smoothly. In comparison to this, there is an area C_data value shown for reference for which the value doesn't change even when the RGB image data changes. For example, when the RGB image data is between (255, 255, 255) to (253, 255, 255), the C_data value stays at 0 without changing. In other words, when an encoding coefficient is used, the C color tone value (E_C_data) changes along with fine level changes in RGB image data, but when an encoding coefficient is not used, if the RGB image data has only changed slightly, an area is generated for which the C color tone value (C_data) does not change.

The reason that this kind of difference occurs by using an encoding coefficient is as follows. In the space that shows r_C_data in FIG. 11, an interpolated value obtained by interpolating the tone value set in a normal color conversion table is shown by a real number. C_data shown for reference at the right side of FIG. 11 is a value for which the interpolated value obtained in this way is rounded to an integer. From this fact, when color conversion is done using a normal color conversion table, we believe that the reason that an area is generated for which no change in the C color tone value occurs even when the RGB image data is changed is because of rounding the interpolated value to an integer. An encoding coefficient obtained by using formula (1) on the r_C_data is shown in the space that shows Ke in FIG. 11. For confirmation, r_C_data is multiplied by the corresponding encoding coefficient Ke, and when the obtained real value is rounded to an integer, this is matched with the value obtained by interpolating the E_C_data. From this fact, when color conversion is done using a proportionally increased color conversion table, the interpolated value will be one that has been multiplied by the encoding coefficient, so even when rounded to an integer, it is possible to reflect slight changes in the RGB image data in the image data after color conversion.

B-4. Setting Method for the Corrected Dot Volume Table

The image data of each color CMYK that was color converted using a proportionally increased color conversion table is data for which image data obtained by a normal color conversion table is multiplied by an encoding coefficient Ke. In light of this, as described previously, when converting the image data of each color CMYK to dot volume data, this is supplemented by replacing with a dot volume table and referencing a corrected dot volume table.

The corrected dot volume table can be set easily by changing the data of the dot volume table. Following, we will explain the principle of changing the dot volume table to set the corrected dot volume table while referring to FIGS. 7 and 9.

As described previously, dot volume data that shows the dot density to be formed for each type of dot is set for the tone values of the CMYK image data. Color printer 200 of the first embodiment can form two types of dots, small dots and large dots, and corresponding to this, in the example shown in FIG. 7, the dot volume data of the small dots and the dot volume data of the large dots are set. By referring to FIG. 7, it is possible to obtain ds64 and 0 for the dot volume data of the small dots and the dot volume data of the large dots, respectively in relation to a tone value 64 of the image data, for example. It is also possible to obtain ds128 and dL128 for the dot density of the small dots and the dot volume data of the large dots, respectively, in relation to the tone value 128 of the image data.

Here, as described previously, the CMYK image data that was color converted by referencing a proportionally increased color conversion table is image data for which the encoding coefficient Ke was multiplied in relation to the CMYK image data obtained by using a normal color conversion table. We will explain this specifically while referring to FIG. 9. If the tone value of the CMYK image data obtained using a normal color conversion table is 64, then when a proportionally increased color conversion table is referenced, color conversion is done to image data of tone value D64. Similarly, when a tone value of 128 is obtained using a normal color conversion table, when a proportionally increased color conversion table is referenced, this is converted to image data with a tone value of D128.

Figure 12:
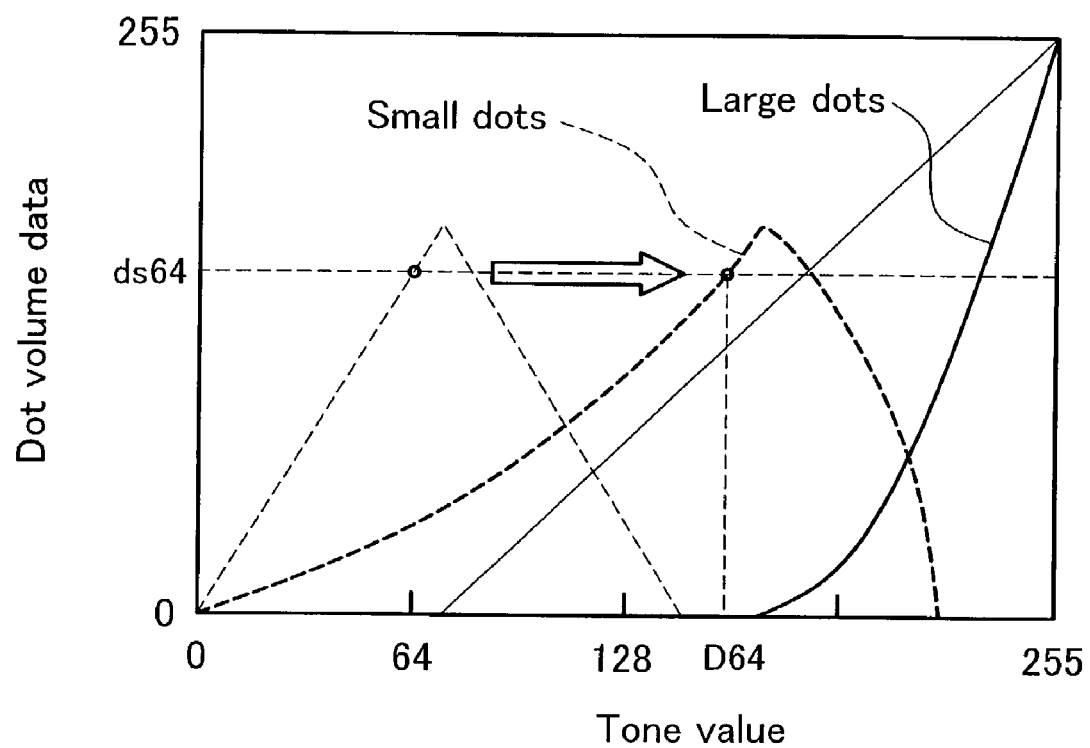
FIG. 12 is an explanatory diagram that shows the principle of setting a corrected dot volume table by correcting a dot volume table.

As is clear from this fact, if dot volume data for tone value 64 of a dot volume table is set in relation to tone value D64 of a corrected dot volume table, it is possible to obtain suitable dot volume data from tone value D64. FIG. 12 is an explanatory diagram that conceptually shows the situation of setting a corrected dot volume table in this way. The thin dotted line shown in FIG. 12 is the dot volume data of small dots set in a normal dot volume table. This is deformed as shown by the arrow, and dot volume data of small dots in relation to a proportionally increased tone value is obtained. In other words, the dot volume data ds64 of the small dots in relation to tone value 64 is set as the dot volume data in relation to tone value D64 that was proportionally increased by multiplying by encoding coefficient Ke. The same kind of deformation can be performed for dot volume data of large dots as well.

Figure 13:
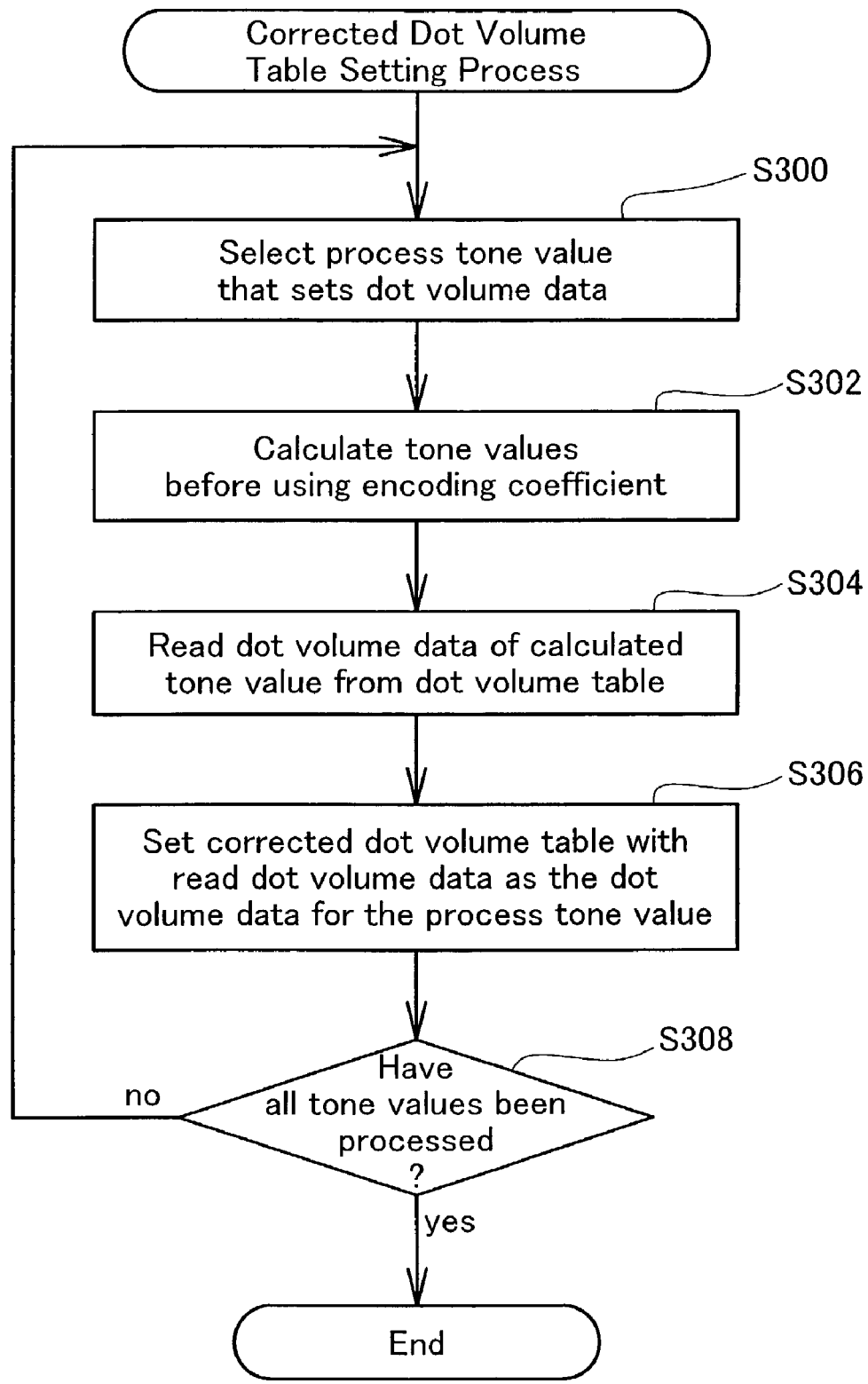
FIG. 13 is a flow chart that shows the flow of the process of setting a corrected dot volume table.

FIG. 13 is a flow chart that shows the flow of the process of setting a corrected dot volume table. A dot volume table is set for each color CMYK, and the following process is also performed for each color, but to avoid the explanation becoming complicated, we will explain without specifying colors hereafter.

When the process of setting the corrected dot volume table starts, first, one process tone value for setting the dot volume data is selected (step S300). The process tone value is the tone value that will be the coordinate value for the horizontal axis in the corrected dot volume table, and with the first embodiment, the image data is expressed as 1 byte, so the process tone value is an integer in a range from 0 to 255. Next, the tone value before making use of the encoding coefficient Ke is calculated (step S302). Specifically, the process tone value for setting in the corrected dot volume table is a tone value multiplied by the encoding coefficient Ke, so this is calculating the tone value before multiplying by encoding coefficient Ke. As a method for calculating the concerned tone value, in a case where the encoding coefficient is set using a numerical equation as with formula (1) noted above, it is possible to calculate using an analytical method, or as explained using FIG. 9, it is possible to read from a graph. The obtained tone value is rounded to an integer.

Dot volume data set in a normal dot volume table is read to the tone value obtained in this way (step S304). For example, in the dot volume table shown in FIG. 7, dot volume data of small dots and large dots is set for the tone value on the horizontal axis, so these dot volume data are read.

In this way, dot volume data read from a normal dot volume table is set in a corrected dot volume table as dot volume data for the process tone value (step S306). In other words, as explained using FIG. 12, the dot volume data for small dots and large dots is written.

By working as described above, if dot volume data is set for one process tone value, a judgment is made whether dot volume data is set for all process tone values (step S308), and when there are tone values left which have still not been set, the system returns to step S300, and this series of processes is repeated continuously until processing of all tone values is completed. In this way, when processing for all tone values is completed, the process of setting the corrected dot volume table ends.

If RGB image data is color converted by referencing a proportionally increased color conversion table set using the method described previously, and the obtained CMYK image data is converted to dot volume data by referencing a corrected dot volume table set using the method described above, then it is possible to obtain suitable dot volume data corresponding to the RGB image data. For the concerned method, the CMYK image data obtained by color converting the RGB image data is image data for which the tone values have been proportionally increased, in other words, image data on which an encoding coefficient has been used, so as described previously, it is possible to obtain dot volume data that reflects even slight tone value changes in the RGB image data.

B-5. Variation of the First Embodiment

Figure 14:
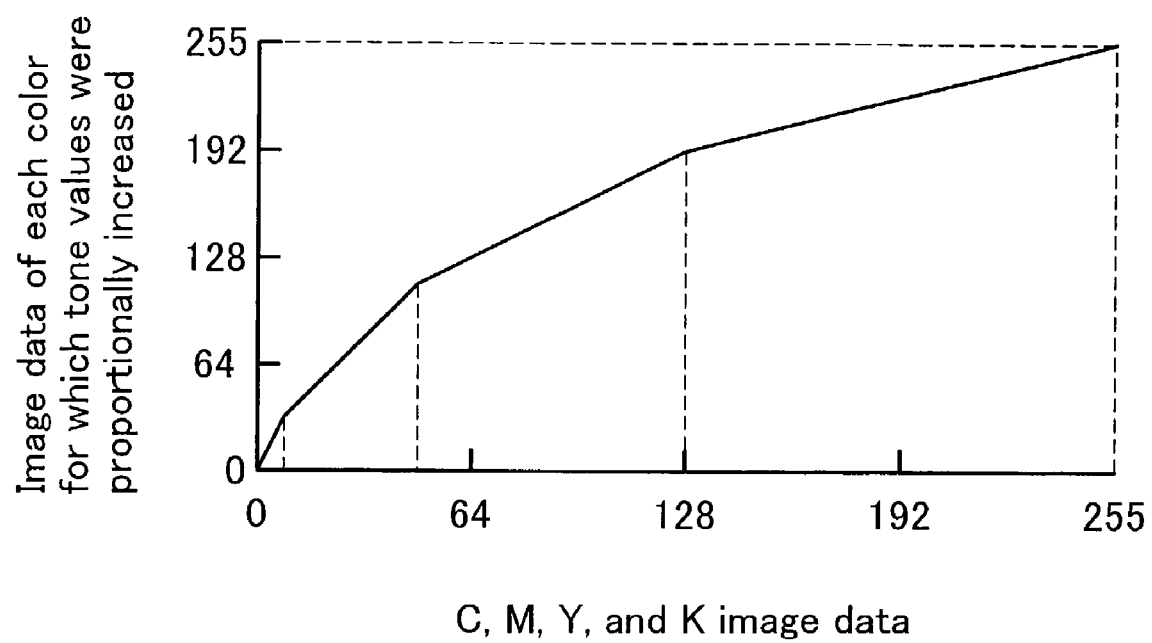
FIG. 14 is an explanatory diagram that shows the situation of directly setting image data for which the tone values have been proportionally increased for a variation example of the first embodiment.

With the first embodiment described above, encoding coefficient Ke was set using a function that changes smoothly as shown in formula (1), and the image data for each color that was proportionally increased from the encoding coefficient Ke was calculated, but as shown in FIG. 14, it is also possible to directly set image data for which the tone value have been proportionally increased. For example, as shown in FIG. 14, it is acceptable to set using a continuous function (polygonal line function) for which the slope changes non-continuously. As described previously, when setting encoding coefficient Ke, it is necessary to set so that the image data for which the tone values have been proportionally increased satisfies specific conditions, but if the image data for which the tone values have been proportionally increased is set directly, then it is easy to inverse calculate an encoding coefficient Ke that satisfies the conditions. Furthermore, even without inverse calculating the encoding coefficient Ke, it is possible to set the proportionally increased color conversion table from FIG. 14, and set corrected dot volume tables from FIGS. 14 and 7.

Moreover, when using the concerned polygonal line function, when interpolating data between grid points of the proportionally increased color conversion table, from the perspective of suppressing errors contained in the interpolation results, it is preferable to not have a very big change in the slope of the straight line for the polygonal line part. It is also preferable to have a small value for the gap between grid points of the color conversion table.

C. Second Embodiment

In the image data conversion process of the first embodiment described above, color conversion was performed by referencing a proportionally increased color conversion table that was recorded in advance. In contrast to this, it is also possible to record in advance a color conversion table that will be the standard, and before doing color conversion, generating a proportionally increased color conversion table from the color conversion table that is the standard, after which color conversion is performed by referencing the generated proportionally increased color conversion table. Hereafter, we will explain the image data conversion process of a second embodiment.

C-1. Image Data Conversion Processing for the Second Embodiment

Figure 15:
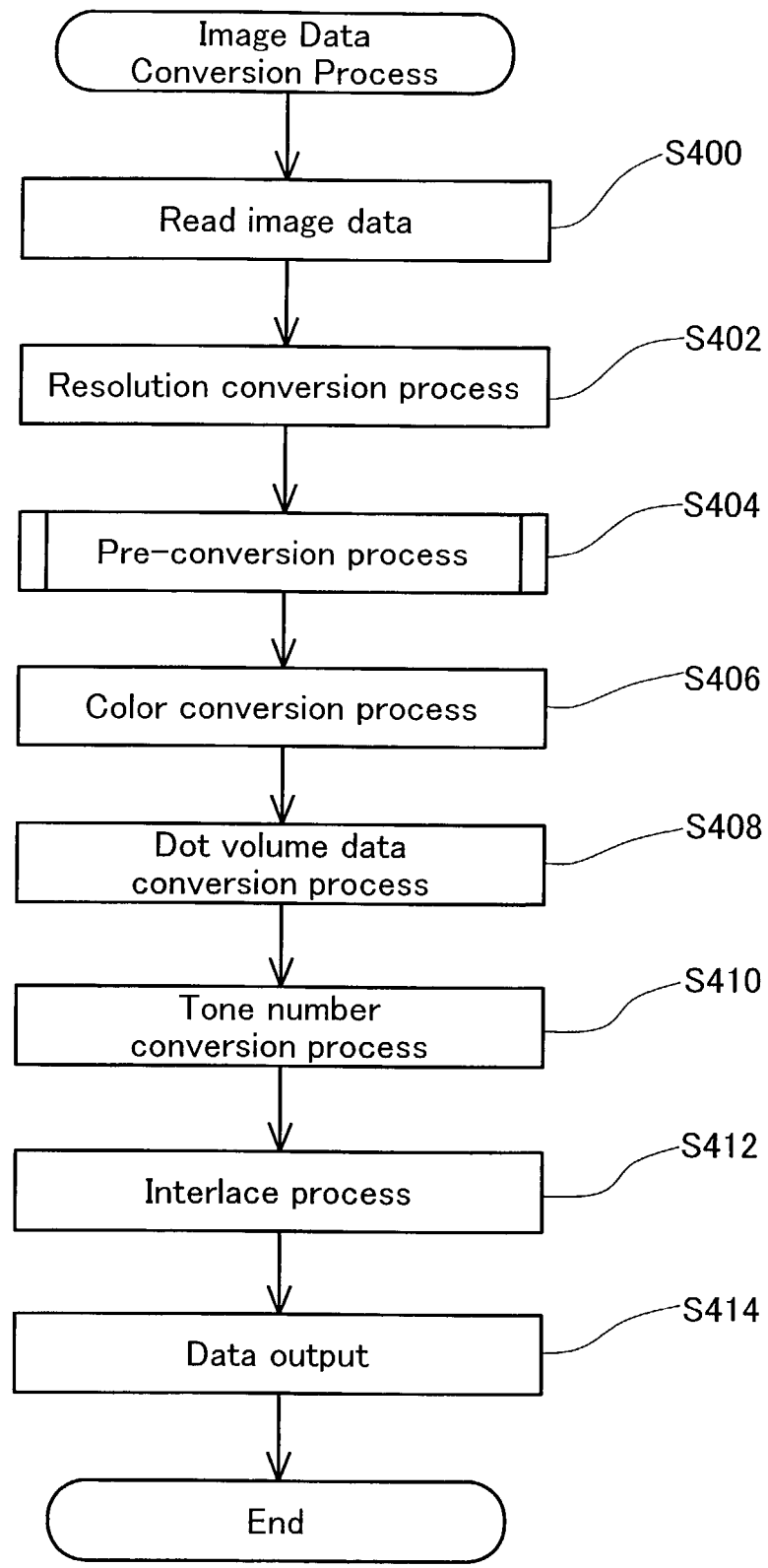
FIG. 15 is a flow chart that shows the flow of the image data conversion process performed by the image processing apparatus of a second embodiment.

FIG. 15 is a flow chart that shows the flow of the image data conversion process of the second embodiment. The image data conversion process of the second embodiment shown in FIG. 15 greatly differs from the image data conversion process of the first embodiment described previously using FIG. 5 in that a pre-conversion process is performed before the color conversion process. Following, we will explain the image data conversion process of the second embodiment while referring to FIG. 15 with a focus on the difference point from the image data conversion process of the first embodiment.

As described previously with the first embodiment, for the image data conversion process of the second embodiment also, the process starts by the operating system of computer 100 starting up the printer driver 12. When the image data conversion process of the second embodiment starts, first, printer driver 12 reads the RGB color image data to be converted (step S400), and next, the resolution of the fetched image data is converted to a resolution for color printer 200 to print (step S402).

When resolution is converted in this way, with the image data conversion process of the second embodiment, a process called pre-conversion processing is performed before doing color conversion (step S404). Pre-conversion processing is a process that is performed to execute color conversion processing at high speed with the printing image of the color image kept as is. Following, we will explain the principle of pre-conversion processing while referring to FIGS. 16 and 17.

Figure 16:
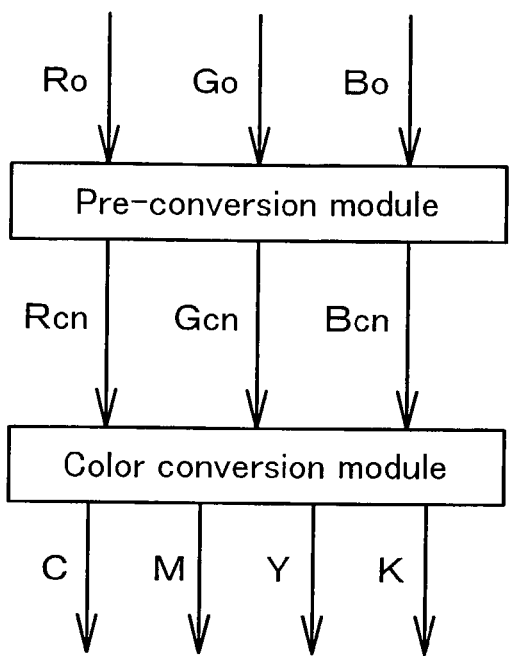
FIG. 16 is an explanatory diagram that shows the principle of the pre-conversion process performed by the image data conversion process of the second embodiment.

FIG. 16 is an explanatory diagram that shows the typical situation of image data being converted for pre-conversion processing. The "pre-conversion module" and "color conversion module" shown in the figure conceptually show the functions executed respectively by the pre-conversion process and the color conversion process within computer 100. Of course, when pre-conversion processing or color conversion processing are performed by respective dedicated electronic circuits, these dedicated electronic circuits correspond to the respective modules. The pre-conversion module fetches image data Ro, Go, and Bo of each color R, G, and B for which the resolution was converted, and after performing a specified conversion, outputs the obtained image data Rcn, Gcn, and Bcn of each color R, G, and B to the color conversion module.

Figure 17:
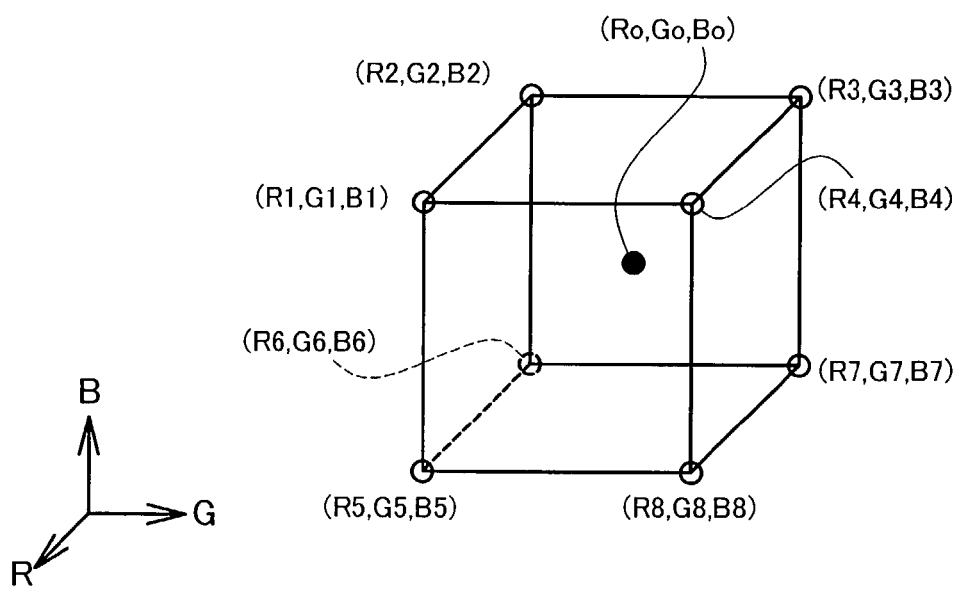
FIG. 17 is an explanatory diagram that conceptually shows the situation of converting RGB image data to grid point image data in the pre-conversion process.

FIG. 17 is an explanatory diagram that conceptually shows the contents of the conversion performed by the pre-conversion module. As described previously using FIG. 6, when we consider the RGB color space that has the tone values of each color R, G, and B as its three axes, it is possible to express RGB image data as coordinate points within the RGB color space. Also, when the RGB color solid is subdivided into a grid form, the color conversion table can be thought of as a three dimensional numerical table on which is recorded the tone values of the colors CMYK that correspond to each grid point. Now, if RGB image data for which the resolution has been converted (Ro, Go, Bo) is given, then we can consider the corresponding coordinate points within the color space (Ro, Go, Bo) to be a small cube of the color conversion table that includes these coordinate points. The black circles shown in FIG. 17 show coordinate points that correspond to RGB image data, and white circles in the figure show eight grid points of the small cube. The pre-conversion module converts fetched RGB image data (Ro, Go, Bo) to image data corresponding to any of the vertices of the small cube, and outputs this to the color conversion module. Specifically, any of (R1, G1, B1) to (R8, G8, B8) are output to the color conversion module as converted image data (Rcn, Gcn, Bcn).

We will explain the reason that it is possible to accelerate the color conversion process that follows after performing this kind of pre-conversion process. As explained using FIG. 6, with the color conversion process of the first embodiment, RGB image data was converted to CMYK image data as follows. First, when RGB image data was received, a cube that contained the coordinate points that correspond to the image data was detected from within the cube that formed the color conversion table, and CMYK image data recorded at each vertex was read. Next, by performing an interpolation operation from the read CMYK image data, the coordinate point CMYK image data was calculated. In contrast to this, with pre-conversion processing, the received RGB image data is converted to image data of any of the grid points that form the color conversion table. Therefore, with the color conversion processing that follows, all that is necessary is to read the CMYK image data recorded in the corresponding grid points, and there is no need to read CMYK image data recorded at each vertex of the cube and to perform an interpolation operation on this. Because of this, by performing pre-conversion processing, it becomes possible to perform color conversion processing at a greatly accelerated level.

Of course, with pre-conversion processing, the received RGB image data (Ro, Go, Bo) is converted to image data (Rcn, Gcn, Bcn) that corresponds to the grid points of the color conversion table, so if we look at each pixel, there are quantization errors that accompany the conversion, and the color that is printed differs from the color that corresponds to the input RGB image data. However, if conversion is done to mutually eliminate the quantization errors that occur with each pixel, then within a fixed range, the RGB image data colors can be expressed accurately, so there is no actual degradation of image quality.

In this way, it is possible to use a variety of methods as a conversion method that would mutually eliminate quantization errors that occur with each pixel. For example, it is possible to randomly select any vertex from the eight vertices that surround the coordinate points of the image data and convert this to the image data of the selected vertices. If this is done, then there will be stochastic diffusion of the quantization errors generated with each conversion, so in a fixed range, it is possible to almost entirely eliminate the quantization errors. Alternatively, using an error diffusion method, it is also possible to convert image data to grid point data using a structural dither method that uses a diffusion type dither threshold matrix. These methods are known methods, so we will omit a detailed explanation of them here.

With the image data process of the second embodiment, it is possible to perform color conversion processing quickly by performing pre-conversion processing as described above. Moreover, we will describe this in more detail later, but with the image data conversion process of the second embodiment, a color conversion table for which the tone values have been proportionally increased is generated in the pre-conversion process from the demands of image quality, and with the next color conversion process, color conversion is performed while referencing the concerned proportionally increased color conversion table.

Printer driver 12 starts dot volume data conversion processing when this kind of color conversion processing has ended (step S408 in FIG. 15). The contents of the dot volume data conversion process are the same as the process of the first embodiment described previously. Specifically, the CMYK image data for which the tone values have been proportionally increased that was obtained by color conversion processing is converted to dot volume data of small dots and large dots for which the proportional increase has been eliminated. The concerned conversion is performed by referencing a dot volume table like that shown in FIG. 7.

When the dot volume data conversion process ends, a tone number conversion process (step S410) and interlace process (step S412) are performed, and the obtained image data is output to color printer 200 as printing data (step S414). Color printer 200 forms ink dots of each color on a printing medium according to the printing data. As a result, a color image that corresponds to the image data is printed on the printing medium.

C-2. Pre-Conversion Processing

Figure 18:
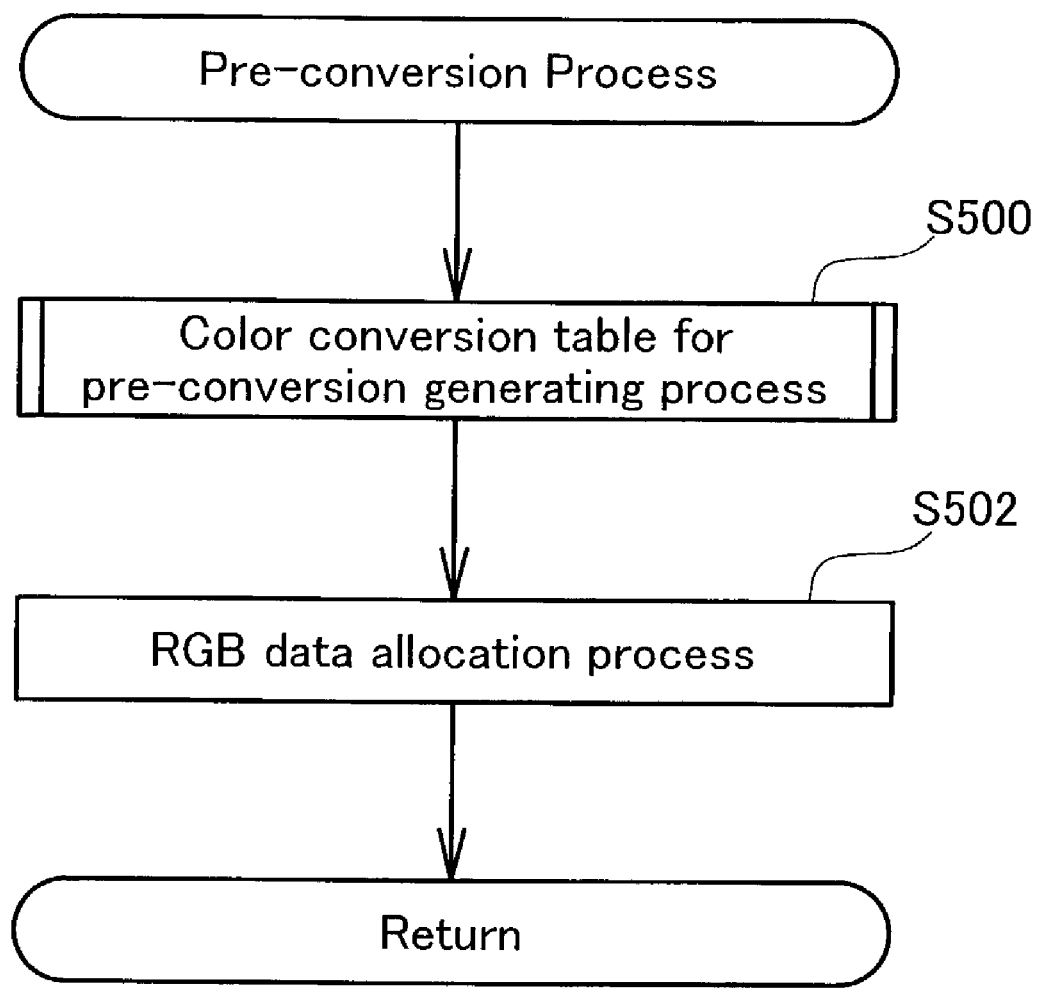
FIG. 18 is a flow chart that shows the flow of pre-conversion processing.
Figure 19A:
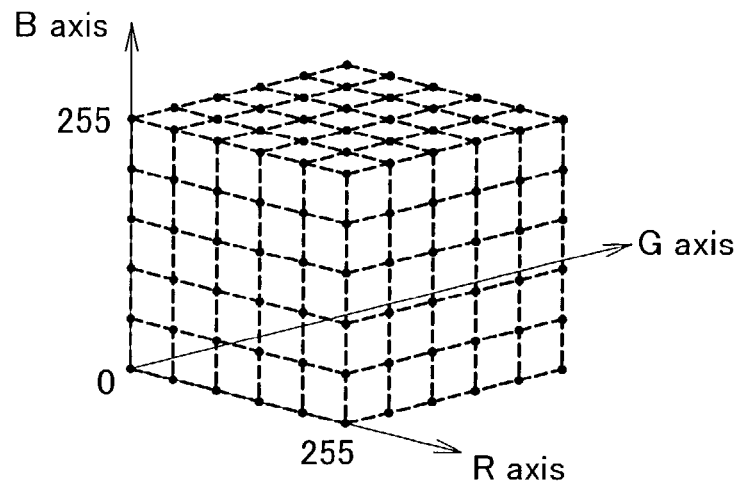
FIG. 19 is an explanatory diagram that shows the situation of generating a color conversion table for pre-conversion from a standard color conversion table in the process of generating a color conversion table for pre-conversion.
Figure 19B:
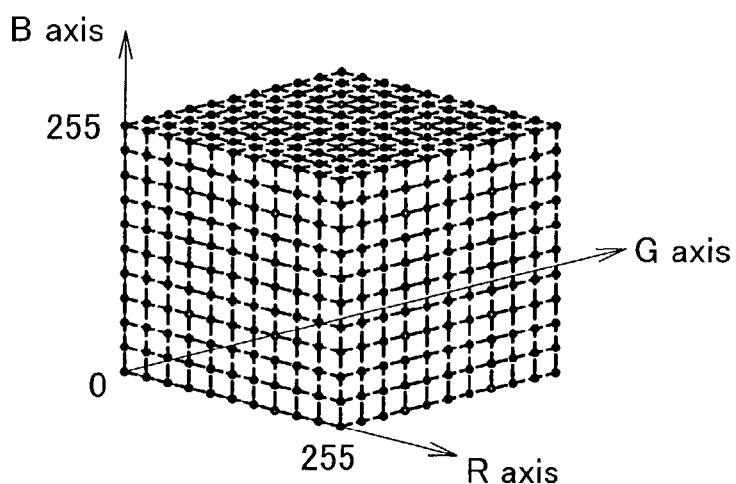
Figure 19C:
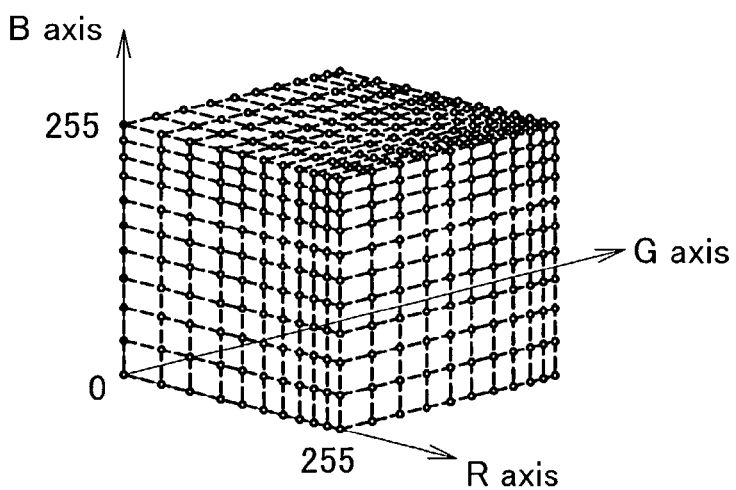

Following, we will give a more detailed explanation of the pre-conversion process performed in the image data conversion process of the second embodiment. FIG. 18 is a flow chart that shows the overall flow of the pre-conversion process of the second embodiment. As shown in the flow chart, the pre-conversion process of the second embodiment is executed in two steps of a process of generating a color conversion table for pre-conversion (step S500) and a process of RGB data allocation (step S502). The process of generating a color conversion table for pre-conversion is a process whereby a pre-conversion color conversion table for referencing during pre-conversion processing is generated from the standard color conversion table that is prerecorded in printer driver 12. FIG. 19 is an explanatory diagram that conceptually shows the situation of generating a color conversion table for pre-conversion from a color conversion table that is the reference standard. FIG. 19(*a*) conceptually shows the color conversion table that is the standard, and FIG. 19(*b*) conceptually shows the color conversion table for pre-conversion. As shown in the figures, the color conversion table for pre-conversion has a higher number of grid points than the color conversion table that is the reference standard. This is due to the following reasons.

The color conversion table has a function that describes that correspondence function of the RGB image data and the CMYK image data (or CMY image data) that expresses colors equivalent to this. Therefore, the grid points of the color conversion table are set to suitable positions and a suitable count so that, in the range for which the correspondence function of the RGB image data and CMYK image data can be described accurately, the grid point count will not become too large. When color converting the RGB image data, data of grid points set in this way undergo an interpolation operation to calculate CMYK image data.

In contrast to this, when performing pre-conversion processing, the RGB image data is forcibly allocated to the RGB image data of grid points of the color conversion table, so quantization error that accompanies this occurs for each pixel. Of course, if we look at a fixed range as described above, the quantization errors that occur with each pixel are mutually eliminated, so there is no shift in color of the printed image. However, if the quantization error is too large, then the image will have a rough feel to it, so in terms of image quality, it is preferable to keep the size of the quantization error within a certain range. On average, the size of the quantization error becomes smaller as the grid point gap becomes narrower, in other words, as the number of grid points in the color conversion table becomes larger. From this fact, as a prerequisite for performing pre-conversion processing, the grid points of a pre-conversion table set so as to include the range for which quantization error is allowed are higher in number than the grid points of a color conversion table which does not have pre-conversion processing as a prerequisite.

Also, with an optimally set color conversion table for pre-conversion and a normal color conversion table, the grid point positions normally do not match. FIG. 19(*c*) shows an example of a color conversion table for pre-conversion for which the grid point positions have been optimized. With the process of generating a color conversion table for pre-conversion (step S500 in FIG. 18), it is also possible to generate a color conversion table for pre-conversion like that shown in FIG. 19(*c*) from the color conversion table that is the reference standard shown in FIG. 19(*a*).

In this way, with the process for generating a color conversion table for pre-conversion (step S500 in FIG. 18), a process is performed whereby a color conversion table for pre-conversion is generated from a normal color conversion table recorded in printer driver 12 (in other words, a color conversion table that is the reference standard). In specific terms, the grid point positions of the color conversion table for pre-conversion are set in advance in printer driver 12, and the CMYK image data for each grid point position is calculated. The CMYK image data of each grid point position is calculated by doing an interpolation operation on CMYK image data at the grid point position while referencing the color conversion table that is the reference standard. The number of grid points in the color conversion table for pre-conversion is larger than in the color conversion table that is the reference standard, so a large memory capacity is required to store the table, but if it is generated from the standard color conversion table in this way, then it becomes possible to save storage space.

Moreover, though we will describe this in more detail later, even when color conversion is performed using a color conversion table for pre-conversion, it is possible that quantization errors of a size not included within the desired range may occur due to insufficient resolution. In light of this, to avoid the occurrence of this kind of problem, with the second embodiment, the process of generating a color conversion table for pre-conversion to be described later is performed and a color conversion table for which the tone values have been proportionally increased is generated, and pre-conversion processing is performed while referencing the generated color conversion table.

As shown in FIG. 18, when a color conversion table for pre-conversion is generated (step S500), the RGB image data for which the resolution has been converted to printing resolution during the resolution conversion process of FIG. 15 is received, and RGB data allocation processing is performed (step S502). The RGB data allocation process is a process whereby, as described previously using FIGS. 16 and 17, RGB image data Ro, Go, Bo) is received and allocated to RGB image data (Rcn, Gcn, Bcn) of the grid points of the color conversion table for pre-conversion. Once all the RGB image data (Ro, Go, Bo) is allocated to data (Rcn, Gcn, Bcn) of the color conversion table for pre-conversion grid points, the pre-conversion processing shown in FIG. 18 ends, and the system returns to the color conversion process of FIG. 15 (step S406). With color conversion processing, by referencing the color conversion table for pre-conversion, it is possible to quickly convert RGB image data to CMYK image data.

As described previously, with the process of generating a color conversion table for pre-conversion of the second embodiment, to avoid occurrence of the problem of the size of the quantization errors due to insufficient resolution not being within the desired range, which causes degradation of the printed image quality, a color conversion table for which the tone values have been proportionally increased is generated. As preparation for explaining the process in detail, we will give a brief explanation of why this kind of problem occurs.

Figure 20:
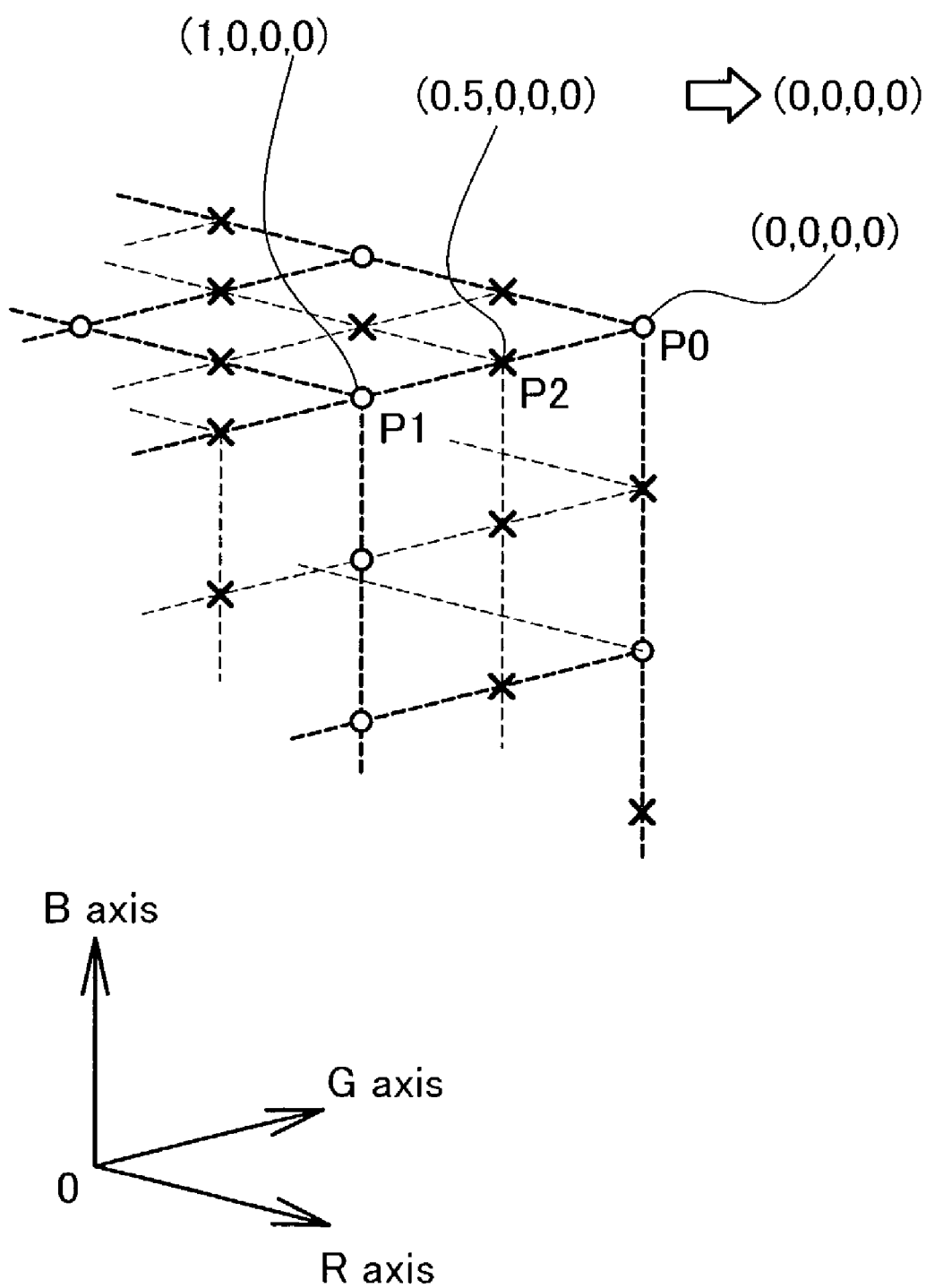
FIG. 20 is an explanatory diagram that shows the reason why there are cases when the quantization errors due to insufficient resolution do not decrease even when pre-conversion is performed while referencing a color conversion table generated for pre-conversion.

FIG. 20 is an explanatory diagram that conceptually shows the situation of generating a color conversion table for pre-conversion from a color conversion table that is a reference standard. The white circles in FIG. 20 show the grid points of the standard color conversion table. The color conversion table for pre-conversion will be a table for which new grid points shown by X marks have been newly added in between these grid points. FIG. 20 shows an expansion near the vertices for which the tone values of each color R, G, and B are all 255. Image data for which all the tone values of each color R, G, and B are 255 appear as white, so at the vertices (255, 255, 255), (0, 0, 0, 0) is recorded as the CMYK image data. Also, at the grid points near here, as CMYK image data, (0, 0, 0, 0) or image data of small tone values near this value is recorded.

When generating a color conversion table for pre-conversion, from the CMYK image data recorded at these grid points shown by white circles, CMYK image data of newly generated grid points shown by X marks is calculated using an interpolation operation. For example, as shown in FIG. 20, CMYK image data (0, 0, 0, 0) is recorded at vertex P0, and CMYK image data (1, 0, 0, 0) is recorded at grid point P1. At this time, CMYK image data of grid point P2 that is newly generated between these grid points can be obtained as (0.5, 0, 0, 0) through an interpolation operation. However, with the color conversion table, CMYK image data is recorded as integer type data, so image data (0.5, 0, 0, 0) obtained by interpolation is recorded rounded to image data (0, 0, 0, 0). In the end, even when a new grid point P2 is generated to make the quantization error smaller, the RGB image data is allocated not to grid point P0 but to grid point P2, and as a result of rounding the CMYK image data recorded at this grid point P2 to an integer, the resulting data is the same as the data of grid point P0, so the quantization error cannot be made smaller. In this way, when calculation CMYK image data of new grid points from a standard color conversion table using an interpolation operation, and when storing this color conversion table for pre-conversion use, when this is recorded with the data rounded due to insufficient resolution of the CMYK image data, there are cases when it is difficult to have the size of the quantization error fall within the desired range.

Of course, it is possible to avoid the occurrence of this kind of problem by increasing the resolution of the image data recorded in the color conversion table using a method of handling the CMYK image data not as integer type data but rather as real number data or as decimal points. However, by using this kind of method, the image data resolution is increased, so there is a significant increase in the storage space required to store the color conversion table, and this is not desirable.

To avoid the occurrence of this kind of problem due to insufficient resolution of the image data recorded in the color conversion table, with the process of generating a color conversion table for pre-conversion for the second embodiment shown in FIG. 18 (step S502), the color conversion table for pre-conversion is generated in the following manner.

Figure 21:
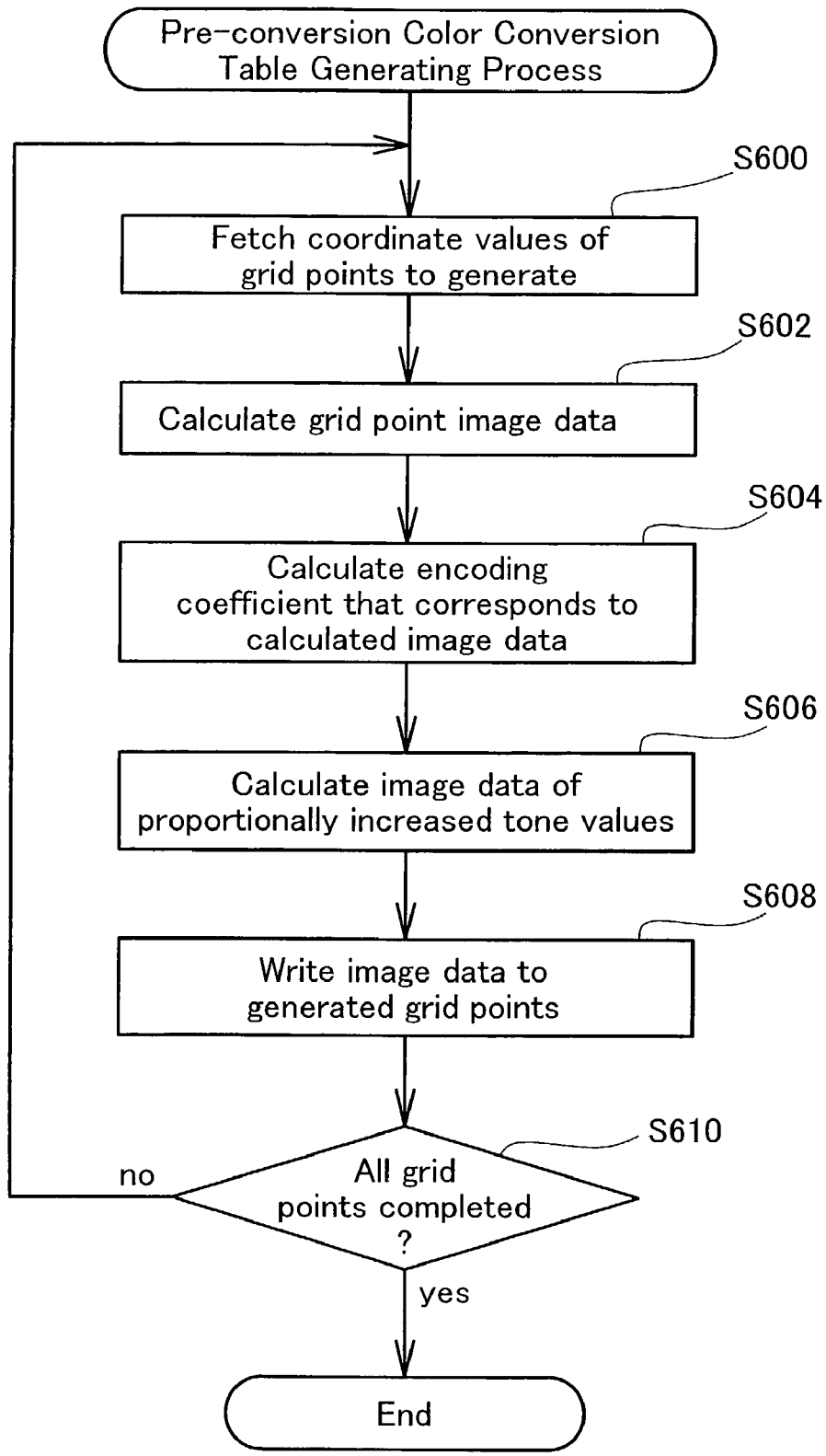
FIG. 21 is a flow chart that shows the flow of the process of generating a color conversion table for pre-conversion.

FIG. 21 is a flow chart that shows the flow of the process of generating a color conversion table for pre-conversion. We will explain the process hereafter according to the flow chart. When starting the process of generating a color conversion table for pre-conversion, first, the coordinate values of the newly generated grid points are fetched (step S600). The coordinate values of the generated grid points are set in advance in printer driver 12, and at step S600, only one coordinate value from among these grid points is fetched.

Next, the CMYK image data to be recorded at the grid points of the fetched coordinate values is calculated (step S602). The CMYK image data can be calculated by referencing the color conversion table that is the standard reference and then doing an interpolation operation on the CMYK image data that corresponds to the coordinate values of the grid points. The image data before being recorded in the color conversion table is handled as a real value, so errors due to rounding of data do not occur at this stage. Next, the encoding coefficient Ke that corresponds to the calculated image data is calculated (step S604). As with the first embodiment described previously, calculation of the encoding coefficient Ke can be done by calculating using formula (1).

Next, by multiplying the calculated CMYK image data by the calculated encoding coefficient Ke, CMYK image data for which the tone values have been proportionally increased is calculated (step S606). CMYK image data obtained in this way is recorded correlated to the grid points obtained previously at step S600, in other words, the grid points generated newly as grid points of the color conversion table for pre-conversion (step S608). As with the standard color conversion table, the color conversion table for pre-conversion also has image data handled as integer type data, so CMYK image data which has been proportionally increased by being multiplied by the encoding coefficient Ke is converted to integer type data when recorded in correspondence to grid points. However, as with the first embodiment, the CMYK image data has been multiplied by the encoding coefficient Ke, so the resolution of the image data is saved without any great loss even when rounded to integer type data.

By working as described above, when the processing of one grid point ends, a judgment is made of whether processing of all grid points recorded as grid points to be generated is made (step S610), and when there are still unprocessed grid points, the system returns to step S600 and repeats the series of processes continuously until the processing of all grid points has ended. In this way, when the processing of all grid points has ended, the process of setting the proportionally increased color conversion table ends, and after returning to the pre-conversion process shown in FIG. 18, the system returns to the image data conversion process of FIG. 15 and starts the dot volume data conversion process (step S408). With the dot volume data conversion process, by referencing a corrected dot volume table like that shown in FIG. 12, it is possible to obtain dot volume data of various types of dots for which the proportional increase has been eliminated from the CMYK image data for which the tone values have been proportionally increased.

As explained above, with the image data conversion process of the second embodiment, when generating a color conversion table that is referenced by the pre-conversion process from the standard color conversion table, a color conversion table is generated for which the tone values of the image data recorded at each grid point are proportionally increased. By doing this, when recording image data with a correlation to grid points, it is possible to suppress the rounding error of data generated due to insufficient resolution of the image data. By performing pre-conversion processing and color conversion processing by referencing a color conversion table for color conversion generated in this way, it is possible to suppress the size of the quantization error to within the desired range, and to print images of good image quality.

Also, the CMYK image data obtained after color conversion processing is image data for which the tone values have been proportionally increased, in other words, image data which has been multiplied by an encoding coefficient Ke, but when converting this data to dot volume data, by simply converting by referencing a corrected dot volume table that was set considering the encoding coefficient Ke instead of using a normal dot volume table, it is possible to obtain suitable dot volume data for which the proportional increase has been eliminated. In other words, with the image data conversion processing of the second embodiment, there are no ill effects such as an increase in processing time, and compared to the normal processing, it is possible to suppress quantization error using pre-conversion to greatly improve image quality.

C-3. Variation of the Second Embodiment

With the second embodiment described above, we explained the color conversion table for pre-conversion as being equipped with more grid points than the color conversion table used as a reference standard. However, this is not necessarily limited to cases of increasing the number of grid points, and for example, the method of the second embodiment can also be suitably applied in cases of generating a color conversion table by moving the position of the grid points from those of the standard color conversion table. The fact that the positions of the grid points for recording the correspondence function of the RGB image data and the CMYK image data do not necessarily match the positions of the grid points for reducing the quantization error due to pre-conversion processing shows that this kind of issue can occur when generating a table from a standard color conversion table with the positions of the grid points shifted for pre-conversion use.

When shifting the positions of the grid points from the positions of the grid points of the standard color conversion table in this way, the CMYK image data recorded at the new grid points is calculated by doing an interpolation operation by referencing the standard color conversion table. Because of this, errors can occur due to rounding of image data when recording image data obtained by interpolation with this correlated to grid points. In light of this, image data obtained by interpolation is recorded after multiplying by an encoding coefficient to proportionally increase the tone values before recording on the grid points. By doing this, it is possible to generate a color conversion table with the resolution of the image data obtained by interpolation kept as is, so it is possible to effectively suppress the generation of quantization errors.

Also, when generating an image conversion table, by making the conversion table one with the tone values proportionally increased by using an encoding coefficient or the like, the technology for avoiding the occurrence of the problems due to insufficient resolution of the data can be used in a variety of cases, not just when generating color conversion tables for pre-conversion use. Possible cases include when one must convert image data values to image data that corresponds to a new ink or new printer because of changing the type of ink installed in the printer or because of changing the model of printer that is to output the printing data. In this kind of case, if a conversion table for converting image data is created, it is possible to convert image data easily. However, when the resolution of the data recorded in the conversion table is insufficient, errors may occur due to data rounding. Alternatively, in cases such as when the size of the data is small due to conversion, errors may occur due to image data rounding. In such a case, it is possible to improve the image quality by supplementing the insufficient resolution by using an encoding coefficient on the data that is recorded in the conversion table.

Above, we explained various embodiments, but the present invention is not limited to the embodiments noted above, and various embodiments can be implemented without straying from the scope of the key points of the invention. For example, a software program (application program) that realizes the functions described above can be supplied to the main memory or external memory device of a computer system for execution via a communication line. Of course, it is also possible to use a program that is reads and executes a software program recorded on a CD-ROM or floppy disk.

Also, with the embodiments described above, we explained cases of image data conversion processing that includes tone number conversion processing executed within a computer, but it is also possible to execute part or all of the image data conversion process on the printer side or using a dedicated image processing apparatus.

Furthermore, the image display device does not have to be a printing device that prints an image by forming ink dots on a printing medium, but can also be, for example, a liquid crystal display device that expresses an image for which the tones continuously change by dispersion of brightness at suitable density on a liquid crystal display screen.

INDUSTRIAL APPLICABILITY

As described above, with the image processing apparatus, printing control apparatus, and image processing method of the present invention, it is possible to sufficiently draw out the potential performance held by an image display device and to accurately express even fine level tone changes, so it is possible to use this suitably as an image output device.

The invention claimed is:

1. An image processing apparatus that converts image data expressed by sets of various tone values which express a color image into dot volume data related to dot formation density of various type dots which express different tone values per respective single dots, said image processing apparatus comprising:
- a color conversion module that receives first image data expressed by sets of various tone values of a first color coordinate system and converts the first image data into second image data expressed by sets of the tone values of each color which comprises a second color coordinate system; and
- a dot volume data conversion module that converts said second image data into dot volume data of said various type dots with respect to each color of said second color coordinate system,
- wherein said color conversion module converts said first image data into second image data which are increased proportionally with the tone value relationship between said second image data kept in the same sequence, when said second image data is at least in a preset tone range where the smallest dots, which express the smallest tone value per respective single dots among the various type dots, are generated, and
- said dot volume data conversion module converts said second image data of which said tone value is increased proportionally into said dot volume data which have been corrected to be disembarrassed from said proportional increase.

2. An image processing apparatus in accordance with claim 1, wherein the image processing apparatus further comprises a proportionally increased color conversion table that records sets of various tone values of said first color coordinate system and sets of the tone values of said second color coordinate system of which said tone values have been proportionally increased, while correlating sets of said first color coordination system and sets of said second color coordination system, and
- said color conversion module converts said first image data into said second image data of which said tone values have been proportionally increased, by referencing said proportionally increased color conversion table.

3. An image processing apparatus in accordance with claim 1, wherein the image processing apparatus further comprises a corrected dot volume table that records increased tone values of said second image data of which the tone values have been proportionally increased and corrected dot volume data which is the dot volume data corrected so as to be embarrassed from effects due to the proportional increase of said second image data, with respect to each color of said second color coordinate system, and
- said dot volume data conversion module converts said second image data of which the tone values have been proportionally increased into said corrected dot volume data for each of said various type dots with respect to each color of said second color coordinate system, by referencing said corrected dot volume table.

4. An image processing apparatus in accordance with claim 1, wherein said color conversion module further comprises a first image data proportional increase module that increases proportionally the tone values of said first image so that the tone values of said second image data are proportionally increased with the sequence of the tone value relationship between said second image data kept the same within said preset tone range of said second image data, while
- said color conversion module converts the proportionally increased first image data into said second image in order to obtain second image data of which said tone values are proportionally increased.

5. An image processing apparatus in accordance with claim 1, wherein said smallest dots are the dots which have the smallest dot size among said various type dots.

6. An image processing apparatus in accordance with claim 1, wherein said smallest dots are the lowest in concentration of colorant among dots for each color of said second color coordinate system.

7. An image processing apparatus in accordance with claim 1, wherein image data expressed by the tone values of each color including at least the three primary colors of light are received as said first image data, and are converted into said dot volume data of each color including at least the three primary colors of ink.

8. An image processing apparatus in accordance with claim 1, said image processing apparatus further comprising:
- a color conversion table on which are recorded sets of various tone values of said first color coordinate system and sets of tone values of each color of said second color coordinate system, with these sets correlated to each other, and
- a proportionally increased color conversion table generating module that performs a specified conversion on said color conversion table and that generates a proportionally increased color conversion table on which are recorded sets of various tone values of said first color coordinate system and sets of tone values of each color of the second color coordinate system of which said tone values have been proportionally increased, with these sets correlated to each other, wherein
- said color conversion module converts said first image data into second image data of which said tone values have been proportionally increased, by referencing said proportionally increased color conversion table.

9. An image processing apparatus in accordance with claim 8, wherein the sets of various tone values of said first color coordinate system which form said proportionally increased color conversion table are different at least in a part from the sets of various tone values of said first color coordinate system which form said color conversion table.

10. An image processing apparatus in accordance with claim 9, wherein said proportionally increased color conversion table records more sets of various tone values of said first color coordinate system than said color conversion table, with the each set correlated to sets of the tone values of each color of the second color coordinate system of which said tone values are proportionally increased.

11. An image processing method that converts image data expressed by sets of various tone values which express a color image into dot volume data related to dot formation density of various type dots which express different tone values per respective single dots, said image processing method comprising:
- (A) a process of receiving first image data expressed by sets of various tone values of a first color coordinate system and converting the first image data into second image data expressed by sets of the tone values of each color which comprises a second color coordinate system; and
- (B) a process of converting said second image data into said dot volume data of said various type dots with respect to each color of said second color coordinate system,
- wherein said process (A) converts said first image data into second image data which are increased proportionally with the tone value relationship between said second image data kept in the same sequence, when said second image data is at least in a preset tone range where the smallest dots, which express the smallest tone value per respective single dots among the various type dots, are generated, and said process (B) converts said second image data of which said tone value is increased proportionally into said dot volume data which have been corrected to be embarrassed from said proportional increase.

12. A recording medium in which a program is recorded in a computer readable manner, said program actualizing a method that converts image data expressed by sets of various tone values which express a color image into dot volume data related to dot formation density of various type dots which express different tone values per respective single dots, said program causing a computer to attain:

(A) a function of receiving first image data expressed by sets of various tone values of a first color coordinate system and converting the first image data into second image data expressed by sets of the tone values of each color which comprises a second color coordinate system; and (B) a function of converting said second image data into said dot volume data of said various type dots with respect to each color of said second color coordinate system, wherein said function (A) converts said first image data into second image data which are increased proportionally with the tone value relationship between said second image data kept in the same sequence, when said second image data is at least in a preset tone range where the smallest dots, which express the smallest tone value per respective single dots among the various type dots, are generated, and said function (B) converts said second image data of which said tone value is increased proportionally into said dot volume data which have been corrected to be embarrassed from said proportional increase.

13. A computer program product for converting image data expressed by sets of various tone values which express a color image into dot volume data related to dot formation density of various type dots which express different tone values per respective single dots, said computer program product comprising:

a computer readable medium; and a computer program stored on said computer readable medium, said computer program causing a computer to perform (A) a function of receiving first image data expressed by sets of various tone values of a first color coordinate system and converting the first image data into second image data expressed by sets of the tone values of each color which comprises a second color coordinate system; and (B) a function of converting said second image data into said dot volume data of said various type dots with respect to each color of said second color coordinate system, wherein said function (A) converts said first image data into second image data which are increased proportionally with the tone value relationship between said second image data kept in the same sequence, when said second image data is at least in a preset tone range where the smallest dots, which express the smallest tone value per respective single dots among the various type dots, are generated and said function (B) converts said second image data of which said tone value is increased proportionally into said dot volume data corrected in order to eliminate said proportional increase.

* * * * *